(12) United States Patent
Park et al.

(10) Patent No.: US 9,628,771 B2
(45) Date of Patent: Apr. 18, 2017

(54) TRANSMITTER AND RECEIVER FOR TRANSMITTING AND RECEIVING MULTIMEDIA CONTENT, AND REPRODUCTION METHOD THEREFOR

(75) Inventors: Hong-seok Park, Anyang-si (KR); Jae-jun Lee, Suwon-si (KR); Yu-sung Joo, Yongin-si (KR); Yong-seok Jang, Hwaseong-si (KR); Hee-jean Kim, Yongin-si (KR); Dae-jong Lee, Hwaseong-si (KR); Moon-seok Jang, Seoul (KR); Yong-Tae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 780 days.

(21) Appl. No.: 13/992,355

(22) PCT Filed: Dec. 7, 2011

(86) PCT No.: PCT/KR2011/009442
§ 371 (c)(1),
(2), (4) Date: Jun. 7, 2013

(87) PCT Pub. No.: WO2012/077982
PCT Pub. Date: Jun. 14, 2012

(65) Prior Publication Data
US 2013/0258054 A1 Oct. 3, 2013

Related U.S. Application Data

(60) Provisional application No. 61/478,161, filed on Apr. 22, 2011, provisional application No. 61/450,779, (Continued)

(30) Foreign Application Priority Data

Dec. 2, 2011 (KR) .................. 10-2011-0128643

(51) Int. Cl.
*H04N 15/00* (2006.01)
*H04N 13/00* (2006.01)
(Continued)

(52) U.S. Cl.
CPC ..... *H04N 13/0051* (2013.01); *H04N 13/0059* (2013.01); *H04N 13/0066* (2013.01);
(Continued)

(58) Field of Classification Search
USPC .............................................. 348/42, 47–51
See application file for complete search history.

(56) References Cited

U.S. PATENT DOCUMENTS 5,619,256 A * 4/1997 Haskell ............. H04N 13/0048
348/43
5,995,516 A * 11/1999 Iwasaki ............ H04N 21/23602
348/474
(Continued)

FOREIGN PATENT DOCUMENTS

CN 1384671 A 12/2002
CN 101044572 A 9/2007
(Continued)

OTHER PUBLICATIONS

Communication dated Jan. 20, 2016, from the State Intellectual Property Office of People's Republic of China in counterpart Application No. 201180059206.6.
(Continued)

Primary Examiner — Helen Shibru
(74) Attorney, Agent, or Firm — Sughrue Mion, PLLC

(57) ABSTRACT

A method and apparatus for reproducing a multimedia content are provided. The apparatus includes: a receiver which is configured to receive, through different paths, a first signal including a left-side image and a first synchronization information item, and a second signal including a right-side
(Continued)

image and a second synchronization information item; and a signal processor which is configured to synchronize and reproduce the left-side image and the right-side image using the first synchronization information item and the second synchronization information item.

1 Claim, 32 Drawing Sheets

Related U.S. Application Data filed on Mar. 9, 2011, provisional application No. 61/420,435, filed on Dec. 7, 2010.

(51) Int. Cl.

| H04N 21/2362 | (2011.01) |
|---|---|
| H04N 21/43 | (2011.01) |
| H04N 21/462 | (2011.01) |
| H04N 21/8547 | (2011.01) |
| H04N 21/81 | (2011.01) |
| H04N 13/04 | (2006.01) |

(52) U.S. Cl.
CPC ......... *H04N 13/04* (2013.01); *H04N 13/0497* (2013.01); *H04N 21/2362* (2013.01); *H04N 21/4307* (2013.01); *H04N 21/4622* (2013.01); *H04N 21/816* (2013.01); *H04N 21/8547* (2013.01)

(56) References Cited

U.S. PATENT DOCUMENTS

| RE37,991 E * | 2/2003 | Legate | H04H 20/14 348/460 |
|---|---|---|---|
| 7,848,425 B2 * | 12/2010 | Cho | H04N 19/597 348/42 |
| 8,045,665 B2 | 10/2011 | Kwon et al. | |
| 8,059,775 B2 | 11/2011 | Kwon et al. | |
| 2003/0053797 A1 * | 3/2003 | Oshima | G11B 20/10 386/201 |
| 2003/0198271 A1 * | 10/2003 | Matveev | B60Q 1/14 372/92 |
| 2006/0269226 A1 | 11/2006 | Ito et al. | |
| 2007/0120972 A1 * | 5/2007 | Kim | H04N 13/0025 348/51 |
| 2007/0196077 A1 | 8/2007 | Seo et al. | |
| 2007/0280361 A1 | 12/2007 | Kwon et al. | |
| 2008/0075437 A1 | 3/2008 | Hamada et al. | |
| 2009/0031365 A1 | 1/2009 | Kwon et al. | |
| 2009/0055650 A1 | 2/2009 | Nakano | |
| 2009/0276819 A1 * | 11/2009 | Kim | H04N 21/235 725/105 |
| 2010/0077204 A1 | 3/2010 | Kawano | |
| 2010/0272417 A1 * | 10/2010 | Nagasawa | H04N 13/0033 386/341 |
| 2010/0315489 A1 * | 12/2010 | Shepherd | H04N 13/0048 348/46 |
| 2010/0325676 A1 | 12/2010 | Kim et al. | |
| 2011/0025821 A1 * | 2/2011 | Curtis | H04N 13/0438 348/43 |
| 2011/0033170 A1 * | 2/2011 | Ikeda | G11B 27/034 386/244 |
| 2011/0081131 A1 * | 4/2011 | Hattori | G11B 27/034 386/328 |
| 2011/0090309 A1 * | 4/2011 | Suzuki | H04N 13/0048 348/43 |
| 2011/0128355 A1 * | 6/2011 | Suzuki | H04N 13/0048 348/50 |
| 2011/0134220 A1 | 6/2011 | Barbour et al. | |
| 2011/0134227 A1 * | 6/2011 | Shin | H04N 19/00 348/54 |
| 2011/0164121 A1 * | 7/2011 | Ikeda | G11B 27/105 348/51 |
| 2011/0254920 A1 | 10/2011 | Yun et al. | |
| 2012/0044358 A1 * | 2/2012 | Thomason | H04N 1/00204 348/175 |
| 2012/0203506 A1 * | 8/2012 | Hatanaka | H04N 1/32101 702/176 |
| 2013/0251342 A1 * | 9/2013 | Park | H04N 21/4627 386/248 |
| 2013/0293677 A1 * | 11/2013 | Lee | H04N 13/0059 348/43 |
| 2014/0032551 A1 * | 1/2014 | Matsuda | H04N 1/32128 707/736 |
| 2014/0047475 A1 * | 2/2014 | Oh | H04N 21/4355 725/40 |
| 2014/0181884 A1 | 6/2014 | Kim et al. | |

FOREIGN PATENT DOCUMENTS

| CN | 101047848 A | 10/2007 |
|---|---|---|
| CN | 101232623 A | 7/2008 |
| CN | 101438615 A | 5/2009 |
| CN | 101578887 A | 11/2009 |
| EP | 1783771 A1 | 5/2007 |
| EP | 2 178 306 A2 | 4/2010 |
| EP | 2 211 556 A1 | 7/2010 |
| EP | 2 285 127 A1 | 2/2011 |
| JP | 2004-40455 A | 2/2004 |
| JP | 2004-357156 A | 12/2004 |
| JP | 2006324739 A | 11/2006 |
| KR | 100801002 B1 | 2/2008 |
| KR | 1020100049873 A | 5/2010 |
| WO | 2007/142445 A1 | 12/2007 |
| WO | 2009/134105 A2 | 11/2009 |
| WO | 2010/053246 A2 | 5/2010 |
| WO | 2010/116895 A1 | 10/2010 |

OTHER PUBLICATIONS

Communication dated Nov. 25, 2015, from the State Intellectual Property Office of People's Republic of China in counterpart Application No. 201180066030.7.
Communication dated Jun. 18, 2015, issued by the United States Patent and Trademark Office in counterpart U.S. Appl. No. 13/992,297.
Communication dated Aug. 5, 2015, issued by the State Intellectual Property Office of P.R. China in counterpart Chinese Application No. 201180059206.6.
Written Opinion dated May 29, 2012 from the International Searching Authority in counterpart application No. PCT/KR/2011/009442.
International Search Report dated May 29, 2012 from the International Searching Authority in counterpart application No. PCT/KR/2011/009442.
Communication dated Jan. 12, 2015, issued by the State Intellectual Property Office of the People's Republic of China in counterpart Chinese Application No. 201180059206.6.
Communication dated Feb. 23, 2015, issued by the United States Patent and Trademark Office in counterpart U.S. Appl. No. 13/992,297.
Communication dated Jul. 7, 2014 issued by the European Patent Office in counterpart European Application No. 11846165.6.
Hyun Lee, et al., "A Structure for 2D/3D Mixed Service Based on Terrestrial DMB System", 3DTV Conference, May 1, 2007, 4 pgs. total, XP031158177.
Communication dated Nov. 12, 2015 issued by United States Patent and Trademark Office in counterpart U.S. Appl. No. 13/992,297.
Communication dated Sep. 15, 2015 issued by the Japanese Intellectual Property Office in counterpart Japanese Patent Application No. 2013-543098.
Communication dated Apr. 25, 2016, issued by the European Patent Office in counterpart European Application No. 11846165.6.
Communication dated Apr. 1, 2016, issued by the United States Patent and Trademark Office in counterpart U.S. Appl. No. 13/992,297.

(56) References Cited

OTHER PUBLICATIONS

Communication dated May 31, 2016, issued by the Japanese Patent Office in counterpart Japanese Application No. 2013-543098.
Communication issued Jul. 11, 2016, issued by the State Intellectual Property Office of the People's Republic of China in counterpart Chinese Patent Application No. 201180059206.6.
Communication issued Aug. 1, 2016, issued by the State Intellectual Property Office of the People's Republic of China in counterpart Chinese Patent Application No. 201180066030.7.
Communication issued Jan. 20, 2017, issued by the European Patent Office in counterpart European Patent Application No. 11846165.6.

* cited by examiner

FIG. 4

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program number | 16 | uimsbf |
|     reserved | 2 | bslbf |
|     version_number | 5 | uimsbf |
|     current_next_indicator | 1 | bslbf |
|     section_number | 8 | uimsbf |
|     last section number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i++) { | | |
|         descriptor() | | |
|     } | | |
|     for(i=0; i<N; i++) { | | |
|         stream_type | 8 | uimsbf |
|         reserved | 3 | bslbf |
|         elementary_PID | 13 | uimsbf |
| | 4 | bslbf |
|         reserved | 12 | uimsbf |
|         ES_info_lebgth | | |
|         for(i=0; i<N2; i++) { | | |
|             descriptor() | | |
|         } | | |
|     } | | |
|     CRC_32 | 32 | rpchof |
| } | | |

Start_PTS, PTS_Difference

FIG. 5

| Syntax | No. of bits | Mnemonic |
|---|---|---|
| adaptation_field() { | | |
|   adaptation_field_length | 8 | uimsbf |
|   if(adaptation_field_length>0) { | | |
|     discontinuity_indicator | 1 | bslbf |
|     random_access_indicator | 1 | bslbf |
|     elementary_stream_priority_indicator | 1 | bslbf |
|     PCR_flag | 1 | bslbf |
|     OPCR_flag | 1 | bslbf |
|     splicing_point_flag | 1 | bslbf |
|     transport_private_data_flag | 1 | bslbf |
|     adaptation_field_extension_flag | 1 | bslbf |
|     if(PCR_flag == '1') { | | |
|       program_clock_reference_base | 33 | uimsbf |
|       Reserved | 6 | bslbf |
|       program_clock_reference_extension | 9 | uimsbf |
|     } | | |
|     if(OPCR_flag == '1') { | | |
|       original_program_clock_reference_base | 33 | uimsbf |
|       Reserved | 6 | bslbf |
|       original_program_clock_reference_extension | 9 | uimsbf |
|     } | | |
|     if(splicing_point_flag == '1') { | | |
|       splice_countdown | 8 | tcimsbf |
|     } | | |
|     if(transport_private_data_flag == '1') { | | |
|       transport_private_data_length | 8 | uimsbf |
|       for(i=0; i<transport_private_data_length; i++) { | | |
|         private_data_byte | 8 | bslbf |
|       } | | |
|     } | | |
|   } | | |

FIG. 6

| Syntax |
|---|
| PES_packet() { |
|   packet_start_code_prefix |
|   stream_id |
|   PES_packet_length |
|   if(stream_id!=program_stream_map |
|   && stream_id!=padding_stream |
|   && stream_id!=private_stream_2 |
|   && stream_id!=ECM |
|   && stream_id!=EMM |
|   && stream_id!=program_stream_directory |
|   && stream_id!=DSMCC_stream |
|   && stream_id!=ITU-T Rec.H.222.1 type E Stream |
|   '10' |
|   PES_scrambling_control |
|   PES_priority |
|   data_alignment_indicator |
|   copyright |
|   original_or_copy |
|   PTS_DTS_flags |
|   ESCR_flag |
|   ES_rate_flag |
|   DSM_trick_mode_flag |
|   additional_copy_info_flag |
|   PES_CRC_falg |
|   PES_extension_flag |
|   PES_header_data_length |
|   if(PTS_DTS_flag='10') { |
|     '0010' |
|     PTS [32...30] |
|     marker_bit |
|     PTS [29...15] |
|     marker_bit |
|     PTS [14...0] |
|     marker_bit |
|   } |
| if(PES_extension_flag=='1') { |
|   PES_private_data_flag |
|   pack_header_field_flag |
|   program_packet_sequence_counter_flag |
|   P-STD_buffer_flag |
|   Reserved |
|   PES_extension_flag_2 |
|   if(PES_private_data_flag='1') { |
|     PES_private_data |
|   } |
|   if(pack_header_field_flag='1') { |
|     pack_field_length |
|     pack_header() |
|   } |
|   if(program_packet_sequence_counter_flag='1') { |
|     marker_bit |
|     program_packet_sequence_counter |
|     marker_bit |
|     MPEG1_MPEG2_identifier |
|     original_stuff_length |
|   } |
|   if(P-STD_buffer_flag='1') { |
|     '01' |
|     P-STD_buffer_scale |
|     P-STD_buffer_size |
|   } |
|   if(PES_extension_flag_2=='1') { |
|     marker_bit |
|     PES_extension_field_length |
|     stream_id_extension_flag |
|     If(stream_id_extension_flag = '0') { |
|       stream_id_extension |
|       for(i=0;i< |
|       PES_extension_field_length;i++){ |
|         reserved |
|       } |
|     } |
|   } |
| } |

FIG. 7

| Syntax | No. of bits | Format |
|---|---|---|
| event_information_table_section() { | | |
|    table_id | 8 | 0xCB |
|    section_syntax_indicator | 1 | '1' |
|    private_indicator | 1 | '1' |
|    reserved | 2 | '11' |
|    section_length | 12 | uimsbf |
|    source_id | 16 | uimsbf |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    num_events_in_section | 8 | uimsbf |
|    for(j = 0; j<num_events_in_section;j++) { | | |
|      reserved | 2 | '11' |
|      event_id | 14 | uimsbf |
|      start_time | 32 | uimsbf |
|      reserved | 2 | '11' |
|      ETM_location | 2 | uimsbf |
|      length_in_sections | 20 | uimsbf |
|      title_length | 8 | uimsbf |
|      title_text() | var | |
|      reserved | 4 | '1111' |
|      descriptors_length | 12 | |
|      for(i=0; i<N; i++) { | | |
|         descriptor() | | |
|      } | | |
|    } | | |
|    CRC_32 | 32 | rpchof |
| } | | |

Start_PTS, PTS_Difference

FIG. 14

Group of pictures header

| group_of_pictures_header() { | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code() | | |
| } | | |

FIG. 22

| pic_timing( payloadSize ) { | C | Descriptor |
|---|---|---|
| if( CpbDpbDelaysPresentFlag ) { | | |
|     cpb_removal_delay | 5 | u(V) |
|     dpb_output_delay | 5 | u(V) |
| } | | |
| if( pic_struct_present_flag ) { | | |
|     pic_struct | 5 | u(4) |
|     for( i=0; i<NumClockTS ; i++ ) { | | |
|         clock_timestamp_flag [i] | 5 | u(1) |
|         if( clock_timestamp_flag [i] ) { | | |
|             ct_type | 5 | u(2) |
|             nuit_field_based_flag | 5 | u(1) |
|             counting_type | 5 | u(5) |
|             full_timestamp_flag | 5 | u(1) |
|             discontinuity_flag | 5 | u(1) |
|             cnt_droped_flag | 5 | u(1) |
|             n_frames | 5 | u(8) |
|             if( full_timestamp_flag ) { | | |
|                 seconds_value/*0..59*/ | 5 | u(6) |
|                 minutes_value/*0..59*/ | 5 | u(6) |
|                 hours_value/*0..23*/ | 5 | u(5) | time_code

FIG. 24

| Syntax | No. of bits | Mnemonic |
|---|---|---|
| TS_program_map_section( )  { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program number | 16 | uimsbf |
|     reserved | 2 | bslbf |
|     version_number | 5 | uimsbf |
|     current_next_indicator | 1 | bslbf |
|     section_number | 8 | uimsbf |
|     last section number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i++) { | | |
|         descriptor( ) | | |
|     } | | |
|     for(i=0; i<N; i++) { | | |
|         stream_type | 8 | uimsbf |
|         reserved | 3 | bslbf |
|         elementary_PID | 13 | uimsbf |
| | 4 | bslbf |
|         reserved | 12 | uimsbf |
|         ES_info_lebgth | | |
|         for(i=0; i<N2; i++) { | | |
|             descriptor( ) | | |
|         } | | |
|     } | | |
|     CRC_32 | 32 | rpchof |
| } | | | time_code → reserved fields

TRANSMITTER AND RECEIVER FOR TRANSMITTING AND RECEIVING MULTIMEDIA CONTENT, AND REPRODUCTION METHOD THEREFOR

CROSS-REFERENCE TO RELATED APPLICATION

This application is a National Stage of International Application No. PCT/KR2011/009442, filed on Dec. 7, 2011, and claims priority from U.S. Provisional Application Nos. 61/420,435, 61/450,779, and 61/478,161 filed on Dec. 7, 2010, Mar. 9, 2011, and Apr. 22, 2011, respectively, and Korean Patent Application No. 10-2011-0128643 filed on Dec. 2, 2011, the disclosure of which is incorporated herein in its entirety by reference.

FIELD

Methods and apparatuses consistent with exemplary embodiments relate to a transmitting apparatus and a receiving apparatus for transmitting and receiving a multimedia content, and a reproduction method thereof, and more particularly, to a transmitting apparatus and a receiving apparatus which transmit and receive a single item of multimedia content through different paths, and a reproduction method thereof.

BACKGROUND

With the development of electronic technologies, various types of electronic apparatuses have been developed and distributed. Receiving apparatuses such as televisions (TV's) are examples of such electronic apparatuses.

As the performance of the TV has improved in recent years, the TV can provide multimedia content such as three-dimensional (3D) content. Since the 3D content includes a left-eye image and a right-eye image, the 3D content has a large size in comparison with that of a two dimensional (2D) content.

However, a transmission bandwidth used in a broadcast network is limited. In order to provide a 3D content through a single broadcast network, a content provider should reduce resolution. However, this creates a problem because the image quality deteriorates.

To address these problems, a method that transmits a left-eye image and a right-eye image through different paths and reproduces 3D content by combining the left-eye image and the right-eye image at a receiving apparatus has been discussed.

The receiving apparatus synchronizes the left-eye image and the right-eye image with reference to a time stamp of each image, that is, a presentation time stamp (PTS). Accordingly, time stamps of two images should be exactly consistent with each other in order to perform synchronization normally. However, if separate transmitting apparatuses generate a left-eye image and a right-eye image or if a left-eye image and a right-eye image are generated at different times, time stamps of two images are rarely consistent with each other. Accordingly, there is a problem in that it is difficult to synchronize the left-eye image and the right eye image that are transmitted and received separately.

Therefore, there is a need for a method of reproducing a high-resolution multimedia content at a receiving apparatus by effectively synchronizing the left-eye image and the right eye image that are transmitted and received separately.

SUMMARY

One or more exemplary embodiments provide a transmitting apparatus and a receiving apparatus which transmit and receive different data through different paths, and also provide synchronization (sync) information for synchronizing the data so that the data can be reproduced, and a reproduction method thereof.

According to an aspect of an exemplary embodiment, there is provided a receiving apparatus including: a receiver which receives, through different paths, a first signal including a left-eye image and first sync information and a second signal including a right-eye image and second sync information; and a signal processor which synchronizes and reproduces the left-eye image and the right-eye image using the first sync information and the second sync information.

The first sync information and the second sync information may include content start information indicating a start point of a content which consists of the left-eye image and the right-eye image.

The signal processor may compare a time stamp of the left-eye image and a time stamp of the right-eye image with the start point of the content, and may correct at least one of the time stamp of the left-eye image and the time stamp of the right-eye image according to a result of the comparing and may synchronize the left-eye image and the right-eye image.

Each of the first sync information and the second sync information may include a difference value between a time stamp of the left-eye image and a time stamp of the right-eye image. The signal processor may correct at least one of the time stamp of the left-eye image and the time stamp of the right-eye image using the difference value, and may synchronize the left-eye image and the right-eye image.

The first sync information may include a frame index of the left-eye image and the second sync information may include a frame index of the right-eye image. The signal processor may compare the frame index of the left-eye image and the frame index of the right-eye image, and may process the left-eye image and the right-eye image having the same frame index to be synchronized with each other.

The first sync information may include a time code of the left-eye image, and the second sync information may include a time code of the right-eye image. The signal processor may compare the time code of the left-eye image and the time code of the right-eye image, and may process the left-eye image and the right-eye image having the same time code to be synchronized with each other.

The first sync information and the second sync information may include UTC information. The signal processor may compare the coordinated universal time (UTC) information and may process the left-eye image and the right-eye image having the same UTC to be synchronized with each other.

The receiving apparatus may include: a signal analyzer which analyzes at least one of the first signal and the second signal and generates a lookup table; a storage which stores the lookup table; and a controller which controls the signal processor to synchronize and reproduce a left-eye image and a right-eye image which match each other according to the lookup table. At least one of the first signal and the second signal may be a real-time transport stream.

According to an aspect of an exemplary embodiment, there is provided a transmitting apparatus including: a data generator which generates transmission data including first data constituting a multimedia content, and sync information for synchronizing the first data with second data constituting the multimedia data; a transmitter which converts the transmission data provided by the data generator into a transmission signal, and transmits the transmission signal to a receiving apparatus.

The sync information may include at least one of content start information indicating a start point of the multimedia content, a time stamp difference value between the first data and the second data, and a frame index.

The data generator may include: an input unit which receives the first data and signaling information; an encoding processor which encodes the first data, and generates the sync information using the signaling information and adds the sync information to the encoded first data; and a multiplexer which generates the transmission data by multiplexing additional data to data generated by the encoding processor.

The first data may include data on at least one image frame, and the sync information may be time code information of the image frame.

The first data may include at least one of a left-eye image and a right-eye image constituting a 3D frame, and the second data may include the other one of the left-eye image and the right-eye image.

The first data may include at least one of video data, audio data, subtitle data, and additional data constituting the multimedia content, and the second data may include the other data from among the video data, the audio data, the subtitle data, and the additional data.

According to an aspect of an exemplary embodiment, there is provided a method for reproducing a multimedia content, the method including: receiving, through different paths, a first signal which includes first data constituting a multimedia content and first sync information, and a second signal which includes second data constituting the multimedia content and second sync information; synchronizing the first data and the second data using the first sync information and the second sync information, and reproducing the multimedia content. Each of the first sync information and the second sync information may include at least one of content start information indicating a start point of the multimedia content, a time stamp difference value between the first data and the second data, a frame index, time code information, UTC information, and frame count information.

According to the exemplary embodiments described above, since the transmitting apparatus and the receiving apparatus transmit and receive different data through different paths, a limit to a transmission bandwidth can be overcome and data can be effectively reproduced using sync information.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects of the exemplary embodiments will become more readily appreciated from the following description of the exemplary embodiments, taken in conjunction with the accompanying drawings of which:

FIG. 4 is a view to explain a method for inserting sync information into a PMT;

FIG. 5 is a view to explain a method for transmitting sync information using a transport stream (TS) adaptation field;

FIG. 6 is a view to explain a method for transmitting sync information using a packetized elementary stream (PES) header;

FIG. 7 is a view to explain a method for transmitting sync information using an event information table (EIT);

FIG. 14 is a view to explain a structure in which a time code is inserted into a GoP header;

FIG. 22 is a view illustrating a structure of a video elementary stream (ES) including a time code;

FIG. 24 is a view illustrating a structure of a program map table (PMT) including a time code;

DETAILED DESCRIPTION OF EXEMPLARY EMBODIMENTS

Figure 1:
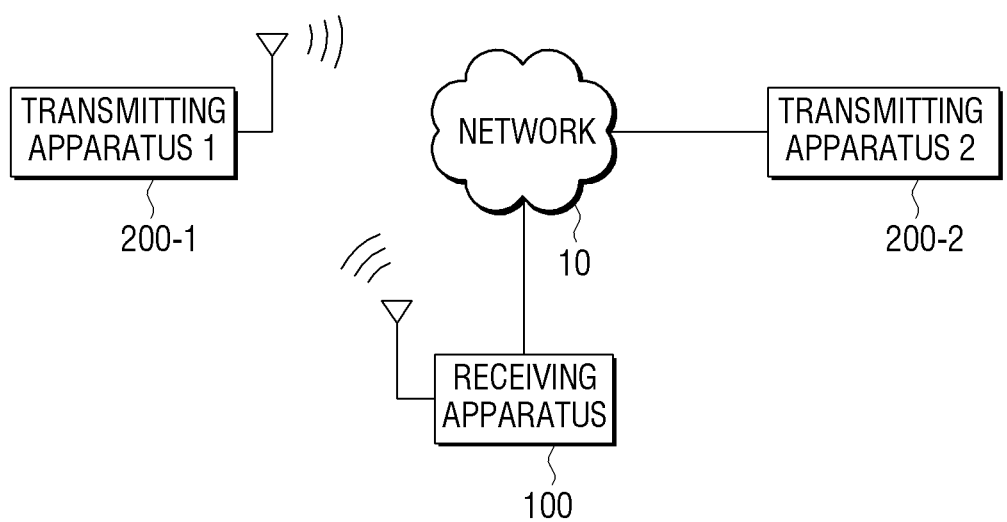
FIG. 1 is a view illustrating a configuration of a multimedia content reproduction system according to an exemplary embodiment.

Reference will now be made in detail to the present exemplary embodiments, examples of which are illustrated in the accompanying drawings, wherein like reference numerals refer to the like elements throughout. The exemplary embodiments are described below in order to explain the inventive concept by referring to the figures.

FIG. 1 is a view illustrating a configuration of a multimedia content reproduction system according to an exemplary embodiment. Referring to FIG. 1, the multimedia content reproduction system includes a plurality of transmitting apparatuses 200-1 and 200-2 and a receiving apparatus 100.

The transmitting apparatuses 1 and 2 200-1 and 200-2 transmit different signals through different paths. For example, the transmitting apparatus 1 200-1 transmits a first signal through a broadcast network and the transmitting apparatus 2 200-2 transmits a second signal through a network 10 as shown in FIG. 1.

The first signal and the second signal include different data constituting a single multimedia content. For example, in the case of a 3D content, a left-eye image and a right-eye image may be included in the first signal and the second signal, respectively. Also, data may be divided into video data and audio data, or may be divided into moving image data, subtitle data, and other data, and the divided data may be included in the first signal and the second signal.

The first signal includes first synchronization (sync) information along with first data, and the second signal includes second sync information along with second data.

A variety of information may be used as the first and second sync information. Specifically, at least one of content start information indicating a start point of a multimedia content, a time stamp difference value between the first data and the second data, a frame index, time code information, coordinated universal time (UTC) information, and frame count information may be used as sync information.

According to the Motion Picture Experts Group (MPEG) standard, a transport stream transmitting broadcast data includes a program clock reference (PCR) and a presentation time stamp (PTS).

The PCR refers to reference time information based on which a receiving apparatus according to the MPEG standard (a set-top box or a TV) sets a time reference to coincide with that of a transmitting apparatus. The receiving apparatus sets a system time clock (STC) according to the PCR. The PTS refers to a time stamp that that indicates a reproducing time in order for a broadcast system according to the MPEG standard to synchronize an image and a sound. In the present disclosure, the PTS is called a time stamp.

When different signals are transmitted from different transmitting apparatuses 100-1 and 100-2, the PCR may vary according to characteristics of the transmitting apparatuses 100-1 and 100-2. Thus, when data is reproduced according to a time stamp matching the PCR, the data may not be synchronized.

The receiving apparatus 100 in the present system may correct a time stamp using sync information or may directly compare sync information to perform synchronization.

Figure 2:
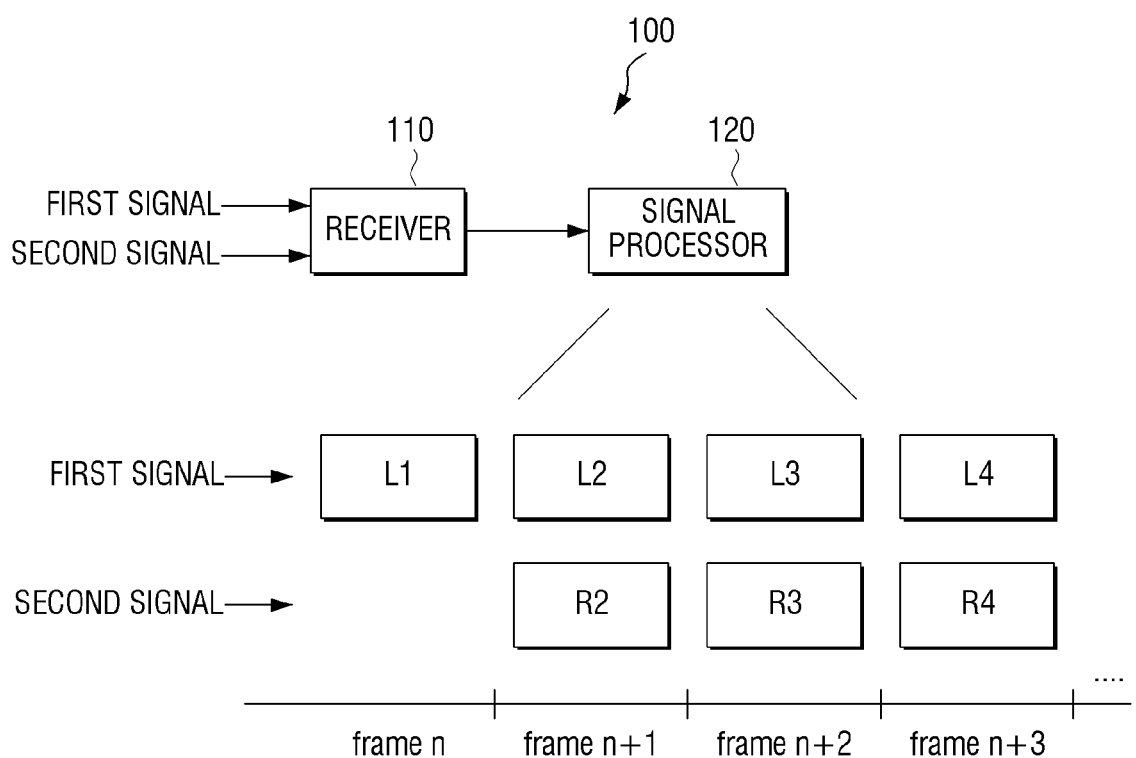
FIG. 2 is a view illustrating a configuration of a receiving apparatus according to an exemplary embodiment.

FIG. 2 is a block diagram illustrating a configuration of a receiving apparatus according to an exemplary embodiment. Referring to FIG. 2, the receiving apparatus 100 includes a receiver 110 and a signal processor 120.

The receiver 110 receives a plurality of different signals through different paths. In the case of a 3D content, the receiver 110 may receive a first signal which includes a left-eye image and first sync information, and a second signal which includes a right-eye image and second sync information.

The first signal and the second signal may be real-time transport streams, or may be storage file formats such as an MP4 file.

The signal processor 120 synchronizes the left-eye image and the right-eye image using the first sync information and the second sync information, and reproduces the left-eye image and the right-eye image. Although not shown in FIG. 2, the signal processor 120 may include a de-multiplexer, a decoder, a renderer, and a display.

The signal processor 120 may configure a 3D frame in a different method according to a type of the receiving apparatus 100. That is, in a polarization method, the signal processor 120 may configure one or two frames by arranging some of the synchronized left-eye images and some of the synchronized right-eye images alternately. Accordingly, the corresponding frame may be output through a display panel which includes a lenticular lens or a parallax barrier.

Also, in a shutter glasses method, the signal processor 120 may alternately arrange a left-eye image and a right-eye image which are synchronized with each other, and may display the left-eye image and the right-eye image through a display panel in sequence.

A variety of information may be used as the first and second sync information according to exemplary embodiments.

Specifically, in an exemplary embodiment in which content start information is used as sync information, the signal processor 120 grasps a start point of a multimedia content using the content start information. The signal processor 120 compares a time stamp of a frame included in first data and a time stamp of a frame included in second data with the start point. According to a result of the comparing, the signal processor 120 may extract a frame index of each data and perform synchronization using the extracted frame index.

That is, even if a time stamp of a L2 frame of the first signal is different from a time stamp of a R2 frame of the second signal, the L2 frame and the R2 frame may be synchronized if a difference between the start point of the content consisting of the first signal and the second signal and the time stamp of the L2 frame is the same as a difference between the start point and the time stamp of the R2 frame. As a result of the synchronizing, an n+1 frame is generated.

The signal processor 120 may detect a frame index by comparing the content start information and the time stamp. For example, if the content start information ($PTS_{H\_start}$) of the first signal is 100 and a time stamp (PTS) of an L1 frame of the left-eye image is 100, PTS-$PTS_{H\_start}$=0. If a time stamp (PTS) of an L2 frame of the next left-eye image is 115, PTS-$PTS_{H\_start}$=15. In this case, the signal processor 120 sets a time stamp interval to 15 and matches the L1 frame with the nth frame and the L2 frame with the n+1th frame. On the other hand, if the content start information of the second signal is 300, a time stamp of an R1 frame is 300, and a time stamp of an R2 frame is 330, the signal processor 120 sets the time stamp interval to 30 and matches the R1 frame with the nth frame and the R2 frame with the n+1th frame.

The signal processor 120 corrects the time stamp of the right-eye image frame or the time stamp of the left-eye image frame so that the time stamps of the two matching frames are consistent with each other.

The right-eye image frame matches the next frame of the left-eye image frame. The signal processor 120 corrects the time stamp of the right-eye image frame to be consistent with the time stamp of the next frame of the left-eye image frame, and synchronizes the right-eye image frame and the next frame of the left-eye image frame.

In an exemplary embodiment, a time stamp difference value between two data may be used as sync information.

That is, each of the first sync information and the second sync information may include a difference value between the time stamp of the left-eye image and the time stamp of the right-eye image. In this case, the signal processor 120 corrects at least one of the time stamp of the left-eye image and the time stamp of the right-eye image, reflecting the difference value, and synchronizes the left-eye image and the right-eye image.

The content start information and the time stamp difference value information may be recorded on an event information table (EIT), a PMT, a private stream, and a transport stream header.

Also, if signals are transmitted as an MP4 file of a storage file format, it is not necessary to provide separate content start information since the signals are recorded from a start point of content due to characteristics of the storage file. However, a frame index value should be extracted from the storage file to be synchronized with a frame index of a real time transport stream extracted based on content start information and a time stamp difference value. The MP4 file provides reproduction timing-related information corresponding to a time stamp through a stts or ctts box. A reproducing order from the start point of the MP4 file may be obtained based on the reproduction timing-related information. Since the reproducing order is consistent with the frame index, synchronization with the frame index of the real time transport stream may be performed using the reproducing order.

According to an exemplary embodiment, frame index information may be used as sync information. The frame index information refers to identification information that is assigned to each frame. The frame index information may be recorded on an EIT of a real time transport stream, a PMT, a private stream, and a transport stream header. The signal processor 120 may correct a time stamp so that the frames having the same frame index have the same time stamp.

Figure 3:
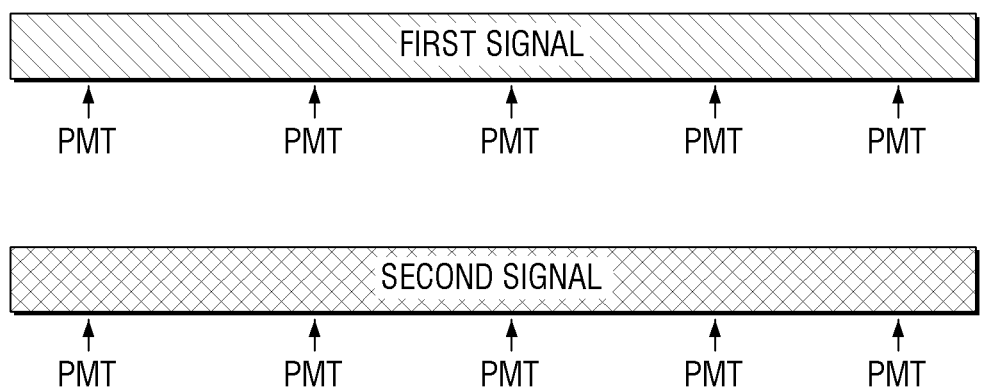
FIG. 3 is a view to explain a process of transmitting sync information using a program map table (PMT) in a stream.

FIG. 3 illustrates structures of a first signal and a second signal which include a program map table (PMT). Referring to FIG. 3, the PMT is included in the first signal and the second signal periodically. The above-described variety of sync information such as the content start information, the time stamp difference value, and the frame index may be included in such a PMT and transmitted.

FIG. 4 is a view illustrating a structure of the PMT. Referring to FIG. 4, a variety of sync information may be transmitted using a reserved area or an extended area of a new descriptor or an existing descriptor in the PMT.

FIG. 5 is a view to explain a method for transmitting a variety of sync information using an adaptation field of a transport stream. In FIG. 5, random_access_indicator, transport_private_data_flag, and private_data_byte are provided in the adaptation field. The random_access_indicator is 1 bit long and means a start of a sequence header if it is set to 1. That is, the random_access_indicator indicates a certain approach point of time of the transport stream. The transport_private_data_flag is 1 bit long and means that there is private data of more than 1 byte if it is set to 1. The private_data_byte is 4 to 5 bytes long and may include sync information such as content start information, a time stamp difference value, and a frame index.

FIG. 6 is a view to explain a method for transmitting sync information using a PES header. Since the PES packet header is provided on a frame basis, a variety of sync information may be recorded on PES_private_data and transmitted. Referring to FIG. 6, the PES_private_data_flag may be set to 1 and sync information may be recorded on the PES_private_data.

FIG. 7 is a view to explain a method for transmitting sync information, such as content start information, a time stamp difference value, and a frame index, using an EIT. Such information may be recorded on a reserved area or an extended area of a new or existing descriptor of the EIT and transmitted.

Figure 8:
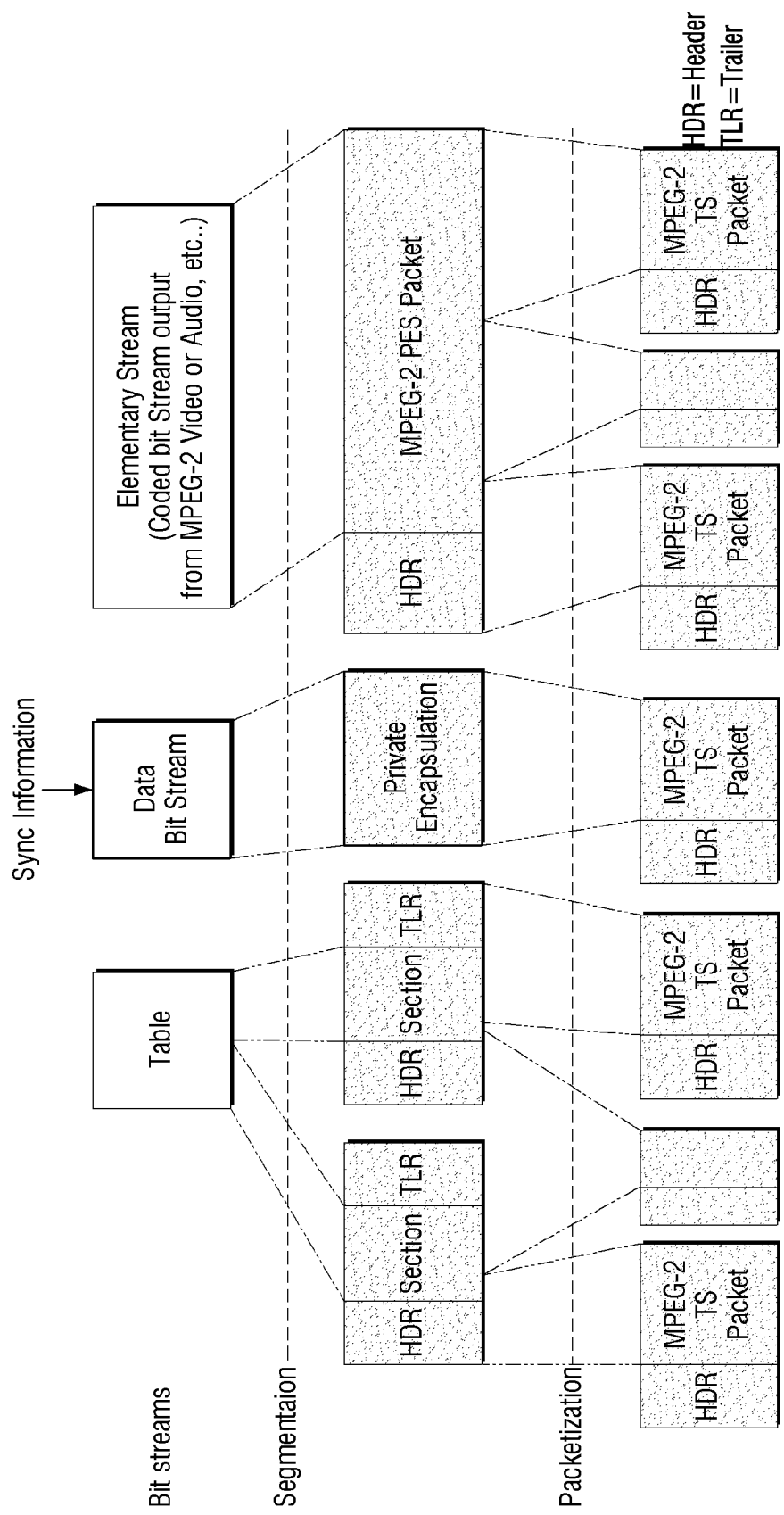
FIG. 8 is a view to explain a method for transmitting sync information using a private stream.

FIG. 8 is a view to explain a method for transmitting sync information using a private stream. As shown in FIG. 8, a private stream on which sync information such as content start information, time stamp information, and frame index information is recorded, that is, a data bit stream, may be included separately from a program elementary stream (PES) and transmitted. In this case, a stream ID of the PES header may use a reserved value besides pre-defined 0xBD and 0xBF. Also, a time code, a UTC, or frame count information may be transmitted using the private stream. This will be explained in detail below.

Figure 9:
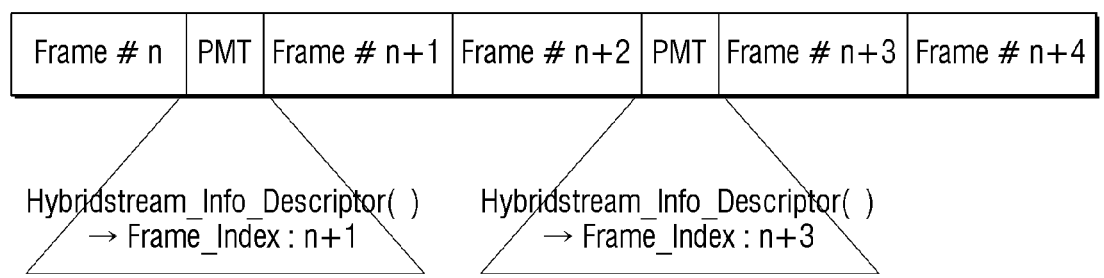
FIG. 9 is a view illustrating a stream structure according to an exemplary embodiment in which a frame index is used as sync information.

FIG. 9 is a view illustrating an example of a transport stream structure including a frame index as sync information. According to the MPEG standard, the transport stream transmits video data, audio data, and other data. Information of each program is recorded on a PMT.

Although FIG. 9 illustrates the frame index which is inserted into the PMT, the frame index may be inserted into a video stream header, an audio stream header, and a TS header according to another exemplary embodiment.

Referring to FIG. 9, each PMT records a frame index of its next frame. If two or more PMTs are provided between the frames, Hybridstream_Info_Descriptor( ) is defined to indicate the same frame index. If a multiplexer of a transmitting apparatus is able to insert a Descriptor( ) on an I frame basis, duplication of data can be prevented.

The receiving apparatus 100 detects the index of the frame with reference to each PMT and then synchronizes the frames of the first signal and the second signal using the frame index.

On the other hand, if data is transmitted in a non-real time stream format rather than a real time transport stream format, a frame index may be provided in a different way from that of FIG. 9.

Figure 10:
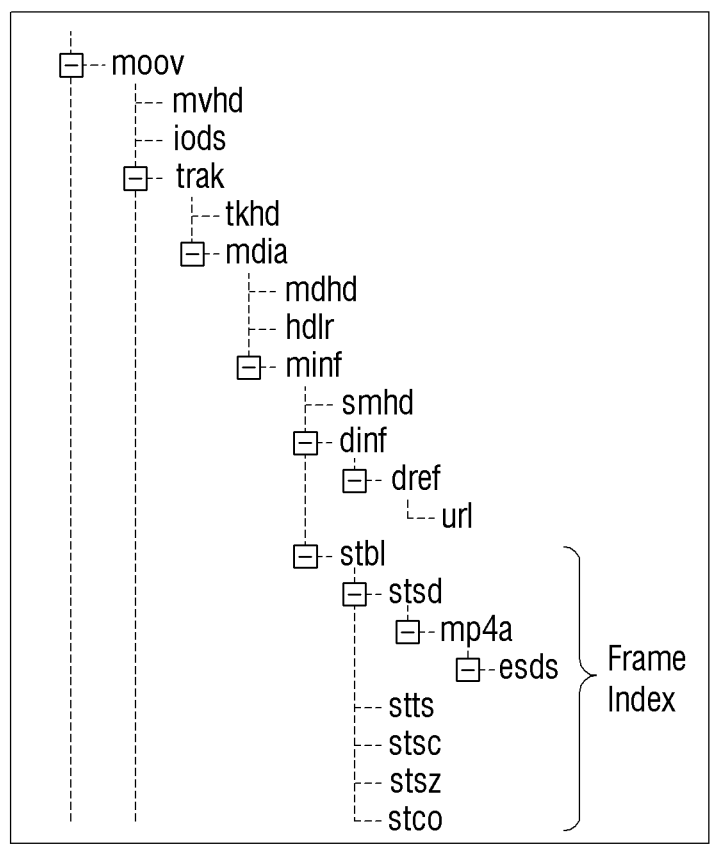
FIG. 10 is a view illustrating an example of a method for inserting sync information in a storage file format.

FIG. 10 is a view illustrating sync information that is recorded on an MP4 file and transmitted. Referring to FIG. 10, sync information such as a frame index may be recorded on a stts or stsc box in an MP4 file directory. Also, an additional box may be defined in an ISO media base file format (14496-12) or a field in a pre-defined box may be extended to provide a time code. For example, a sync sample table (stss) box for providing random access may be extended to provide a time code.

Although FIGS. 9 and 10 illustrate the case in which the frame index is inserted, other sync information may be transmitted in the same way as in FIGS. 9 and 10.

Also, although the first signal and the second signal are explained in FIG. 1, the first signal may be called a main stream and the second signal may be called a hybrid stream. Although FIGS. 9 and 10 illustrate a structure of the hybrid stream, the main stream may have the same structure. In this case, it is obvious that the name of the descriptor of FIG. 9 may be changed.

Figure 11:
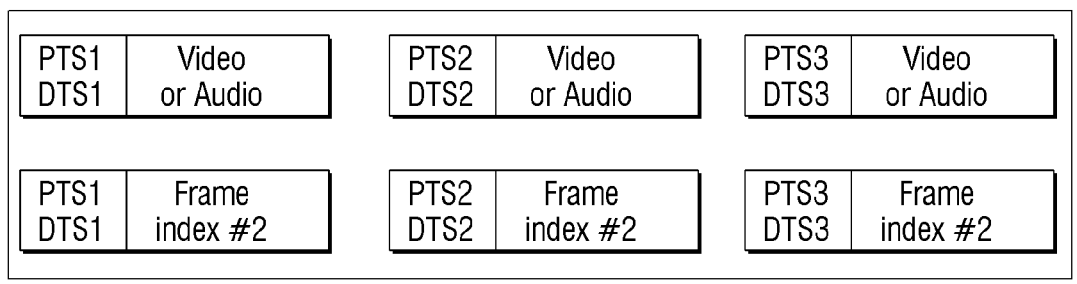
FIG. 11 is a view to explain a method for providing a frame index using a separate private stream in a transport stream.

FIG. 11 is a view illustrating a case in which a frame index is transmitted through a separate private stream. As shown in FIG. 11, the first signal may provide a private stream separately from a multimedia stream such as video or audio data, and may provide a frame index value to be synchronized with the second signal through the corresponding private stream. In this case, if the second signal is a real time transport stream of the same structure as that of FIG. 11, the receiving apparatus may detect a frame index from a private stream of the corresponding transport stream and may synchronize the frame index.

If the second signal is a storage file format having the structure of FIG. 10, a frame index may be identified from a stbl box of the storage file and may be compared with the frame index of the first signal.

According to an exemplary embodiment, a time code, UTC information, and frame count information may be used as sync information.

Figure 12:
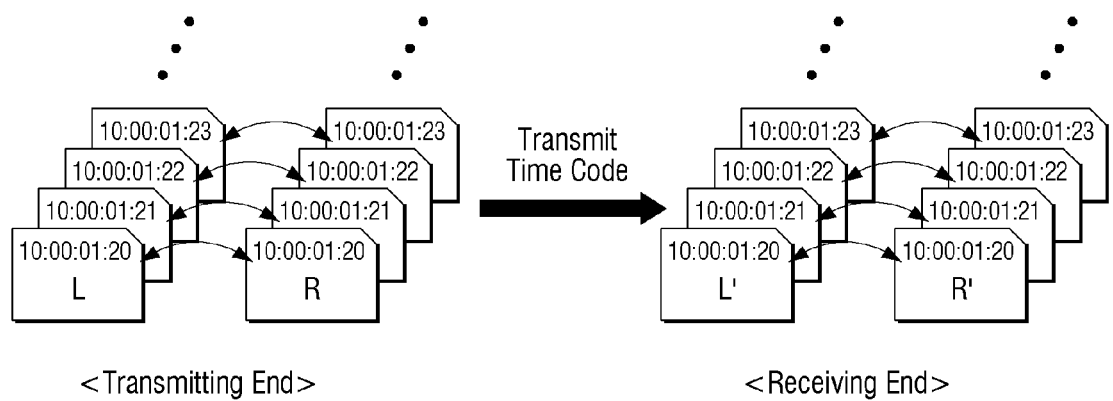
FIG. 12 is a view to explain a method for synchronizing according to an exemplary embodiment in which a time code is used as sync information.

FIG. 12 is a view to explain a method for synchronizing frames using a time code as sync information. The time code is a series of pulse signals that are generated by a time code generator, and is a signal standard that is developed to manage edition easily. When content is created or edited, the same time code is used to manage synchronization between a left-eye image and a right-eye image. Accordingly, the time code is maintained in the same pair regardless of when a stream is generated or transmitted.

Specifically, a society of motion picture and television engineers (SMPTE) time code may be used. That is, in the SMPTE 12M, the time code is represented in a form of "clock:minute:second:frame". The SMPTE time code may be divided into a longitude time code (LTC) and a vertical interval time code (VITC) according to a recording method. The LTC is recorded in an advancing direction of a tape. The LTC may consist of data of 80 bits in total, including visual information (25 bits), user information (32 bits), sync information (16 bits), preserved area (4 bits), and frame mode display (2 bits). The VITC may be recorded on two horizontal lines in a vertical blanking interval of a video signal.

The SMPTE RP-188 defines an interface standard for transmitting a time code of an LTC or VITC type as ancillary data. A time code and additional information on the time code are newly defined and may be transmitted according to such an interface standard.

The additional information on the time code may include a time code on another image that is provided when time codes of a left-eye image and a right-eye image are not consistent with each other, 2D/3D conversion information indicating whether a current image is a 3D image or not, and start point information of a 3D image. The additional information may be provided through a user information area or a preserved area (or a non-allocated area). Also, in the case of a media that does not include a time code, a time code space may be defined and extended according to a network protocol and may be used. For example, a time code may be provided through RTP header extension.

The transmitting apparatuses 200-1 and 200-2 transmit a time code of a left-eye image and a time code of a right-eye image as first sync information and second sync information along with the left-eye image and the right-eye image.

The receiving apparatus 100 may correct the time stamp of the left-eye image and the right-eye image using the received time code, or may directly compare the time code and may synchronize the left-eye image and the right-eye image by detecting the left-eye image and the right eye image having the same time code.

The time code may be recorded on a video elementary stream (MPEG GoP), an audio elementary stream, a transport stream header, a private stream, or a PMT. If the time code is recorded on the transport stream header, Random access Indicator, Transport_private_data_flag, and Private_data_byte may be used.

Figure 13:
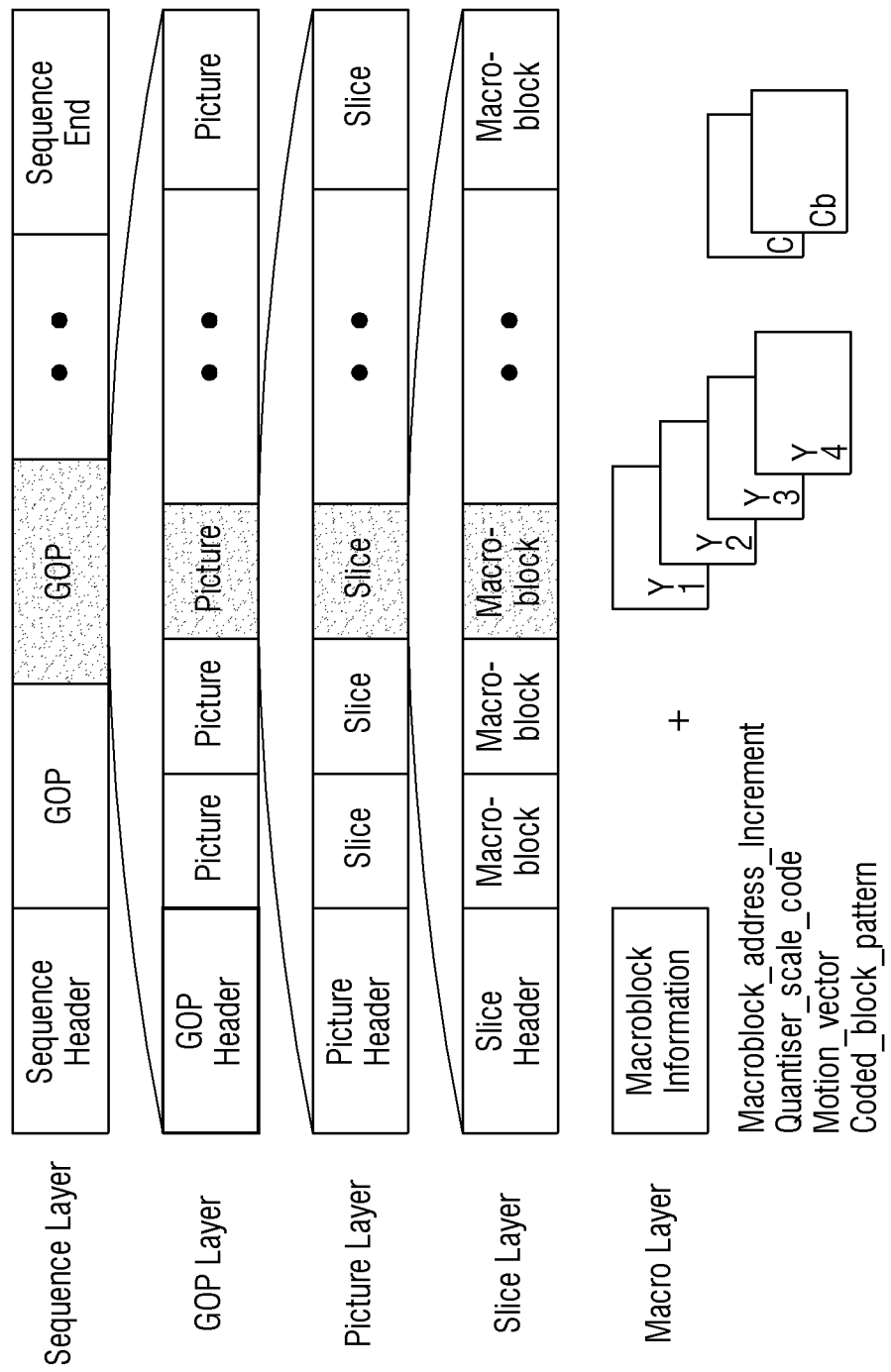
FIG. 13 is a view to explain an example of a method for transmitting a time code.

FIG. 13 illustrates a structure of an MPEG stream in which a time code is recorded on a GoP header. FIG. 14 illustrates an example of a syntax structure of the GoP header of FIG. 13.

Referring to FIG. 14, a time code may be recorded as data of 25 bits. As shown in FIGS. 13 and 14, the time code may be transmitted to the receiving apparatus 100 on a GoP basis.

Figure 15:
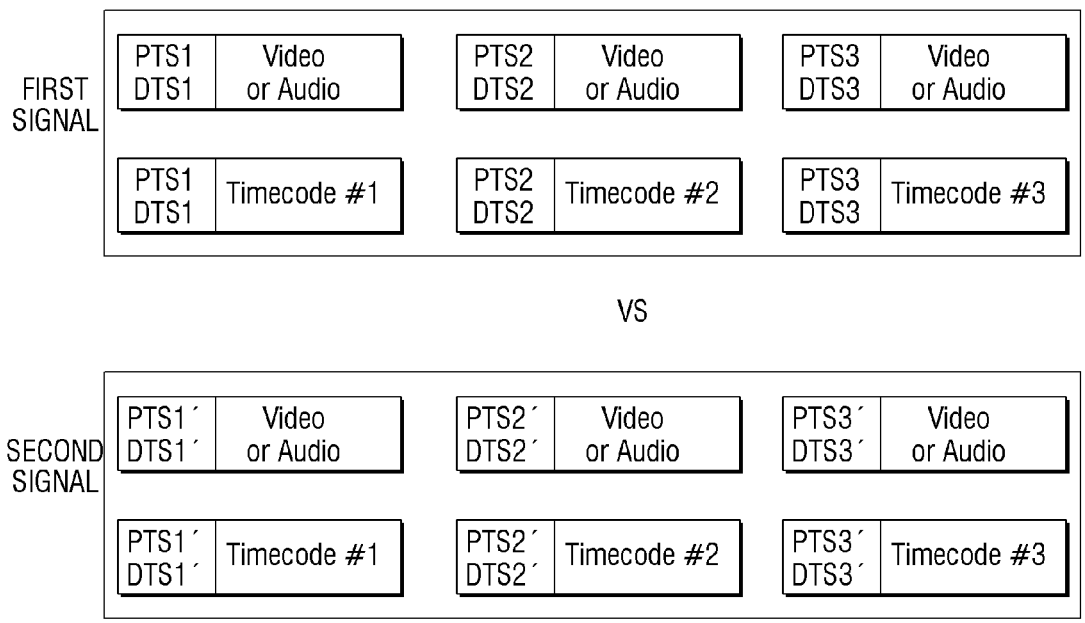
FIG. 15 is a view to explain a method for synchronizing by comparing first and second signals which transmit a time code using a separate private stream.

FIG. 15 illustrates a case in which a time code is provided through a separate private stream. The first signal provides a private stream separately from video or audio streams. The private stream includes a time code for synchronization with the second signal. The second signal also provides a private stream separately from video or audio streams. The receiving apparatus 100 compares the time codes recorded on the private streams of the first signal and the second signal. Accordingly, the receiving apparatus 100 synchronizes first signal data of PTS1 and DTS1, and second signal data of PTS1' and DTS1', which have the same time code, and reproduces them. The receiving apparatus 100 compares the time codes regarding the other signal data and synchronizes the data.

A transport stream including a private stream may be configured as shown in FIG. 8. As shown in FIG. 8, a private stream on which a time code is recorded, that is, a data bit stream, may be included and transmitted separately from a PES. In this case, a stream ID of a PES header may use a reserved value besides pre-defined 0xBD and 0xBF. The UTC or the frame count information may be transmitted similarly to the time code and thus a detailed description thereof is omitted.

Figure 16:
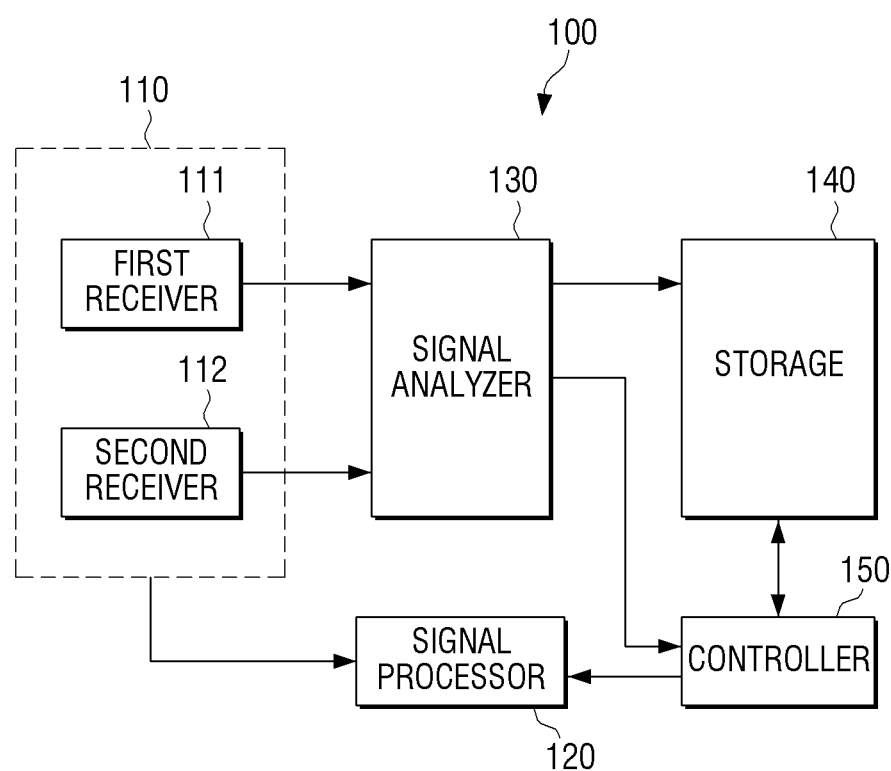
FIG. 16 is a view illustrating a configuration of a receiving apparatus according to an exemplary embodiment.

FIG. 16 is a block diagram illustrating a configuration of a receiving apparatus according to an exemplary embodiment. Referring to FIG. 16, the receiving apparatus includes a signal analyzer 130, a storage 140, and a controller 150 in addition to the receiver 110 and the signal processor 120.

The receiver 110 includes a first receiver 111 and a second receiver 112. The first receiver 111 and the second receiver 112 receive a first signal and a second signal which are transmitted through different paths respectively. The first and second receivers 111 and 112 may be configured in various ways according to their communication paths. For example, if the receiver is a module to receive signals transmitted through a broadcast network, the receiver may include an antenna, a tuner, a demodulator, and an equalizer. If the receiver receives signals through a network, the receiver may include a network communication module.

The signal analyzer 130 analyzes at least one of the first signal and the second signal, and generates a lookup table. Since different signals are received through different paths, one of the first signal and the second signal may be received later than the other one. For example, if a channel is changed on the air, the channel may be changed after a 3D content starts. At this time, the first signal and the second signal should be synchronized with each other swiftly even if the first signal and the second signal are all real time transport streams. Considering this, information on frames that match each other using sync information may be recorded as a lookup table. The lookup table may include index information of frames that are determined to match each other based on the variety of sync information described above.

The lookup table generated by the signal analyzer 130 is stored in the storage 140.

The controller 150 may control the signal processor 120 to synchronize and reproduce the left-eye image and the right-eye image which match each other with reference to the lookup table.

Figure 17:
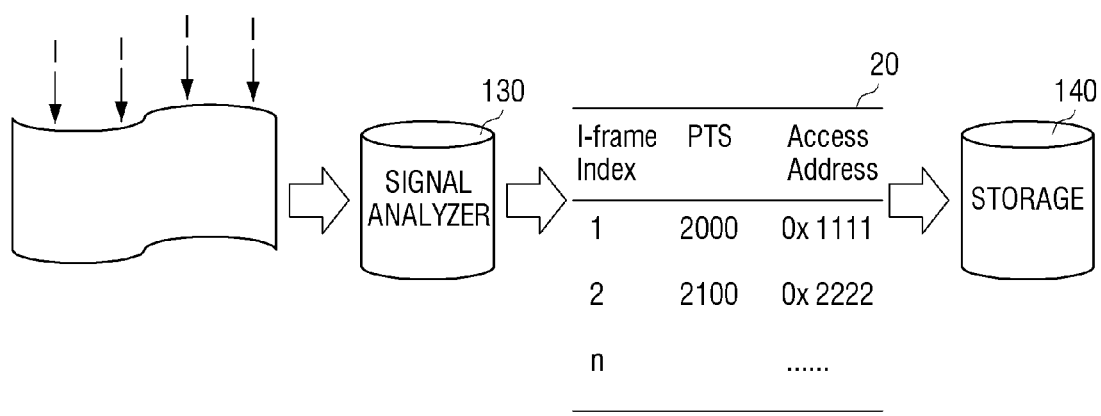
FIG. 17 is a view to explain a method for synchronizing using a lookup table.

FIG. 17 is a view to explain a process of generating and storing a lookup table. As shown in FIG. 17, when a second signal according to the MPEG standard, that is, a hybrid stream, is received, the signal analyzer 130 detects an index of an I frame with reference to sync information. The signal analyzer 130 generates a lookup table 20 including a time stamp and a memory address of the corresponding frame, and stores the lookup table 20 in the storage 140.

The fame index may be detected by comparing content start information and a time stamp of the corresponding frame or using a time stamp difference value as described above. This has been described above and thus a redundant explanation is omitted.

Figure 18:
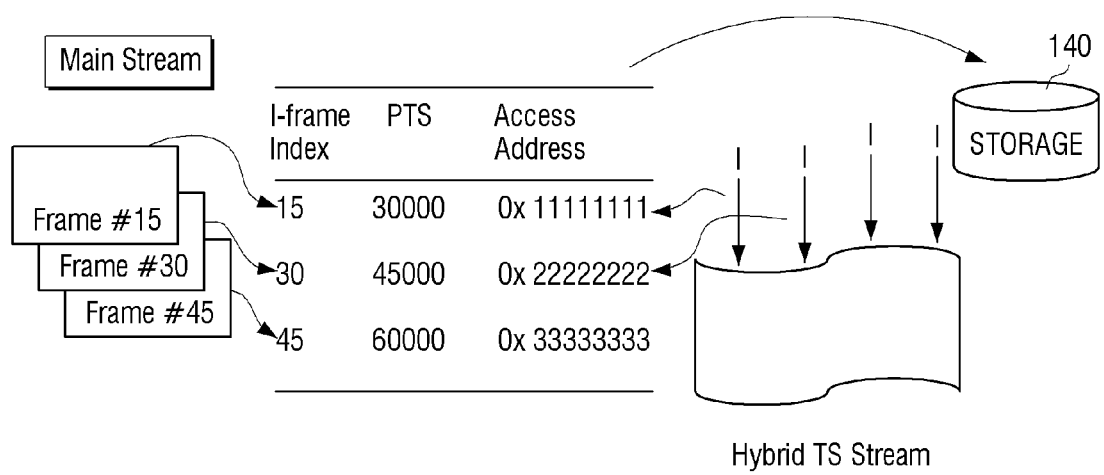
FIG. 18 is a view to explain a method for synchronizing using a lookup table on which a frame index is recorded.

FIG. 18 illustrates a process of generating and storing a lookup table when frame index information itself is provided as sync information. Referring to FIG. 18, frame index information on each frame of the first signal is transmitted along with the first signal, that is, a main stream.

Accordingly, frame index information on each frame of the second signal, that is, the hybrid stream, is also recorded on the lookup table 20. When the matching relationship of the frames of the first signal and the second signal is recorded on the lookup table 20, the controller 150 may control the signal processor 120 to synchronize and reproduce the first signal and the second signal with reference to the matching relationship.

If frame index information is directly provided, the signal analyzer 130 of FIG. 16 may be omitted.

Figure 19:
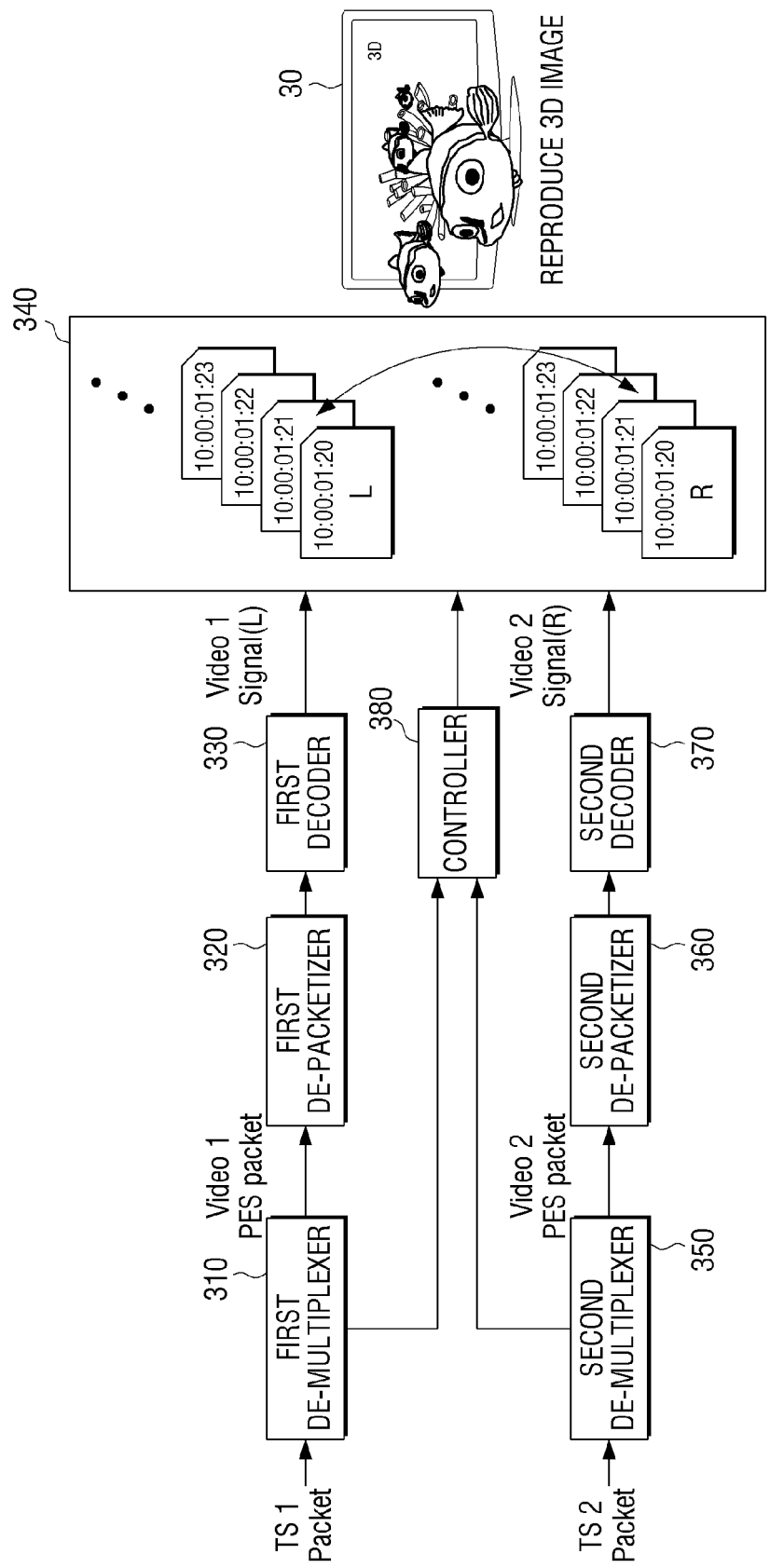
FIGS. 19 to 21 are views illustrating various examples of a receiving apparatus which synchronizes using a time code.

FIG. 19 is a view illustrating a configuration of a receiving apparatus according to an exemplary embodiment in which a time code is used as sync information. Referring to FIG. 19, a receiving apparatus 300 includes a first de-multiplexer 310, a first de-packetizer 320, a first decoder 330, a renderer 340, a second de-multiplexer 350, a second de-packetizer 360, a second decoder 370, and a controller 380.

The first de-multiplexer 310, the first de-packetizer 320, the first decoder 330, the renderer 340, the second de-multiplexer 350, and the second de-packetizer 360 may be included in the signal processor 120 of FIGS. 2 and 16.

The first de-multiplexer 310 and the second de-multiplexer 350 separate time codes from a first signal and a second signal, respectively, and provide the time codes to the controller 380. The first de-multiplexer 310 and the second de-multiplexer 350 provide video PES packets from which the time codes are separated to the first de-packetizer 320 and the second de-packetizer 360.

The first de-packetizer 320 and the second de-packetizer 360 parse the packets from which the time codes are separated and provide video data to the first decoder 330 and the second decoder 370.

The first decoder 330 and the second decoder 370 decode the video data and provide the decoded video data to the renderer 340. The renderer 340 synchronizes the video data of the first signal and the video data of the second signal with each other under the control of the controller 380, thereby reproducing a 3D image 30.

If the second signal is a non-real time stream and the first signal is a real time stream, the controller 380 may obtain the time code of the second signal in advance and may wait for the second signal. After that, when the time code of the first signal is obtained, the controller 330 compares the two time codes and searches for matching frames. The controller 380 controls the renderer 340 to synchronize and reproduce the searched frames.

Figure 20:
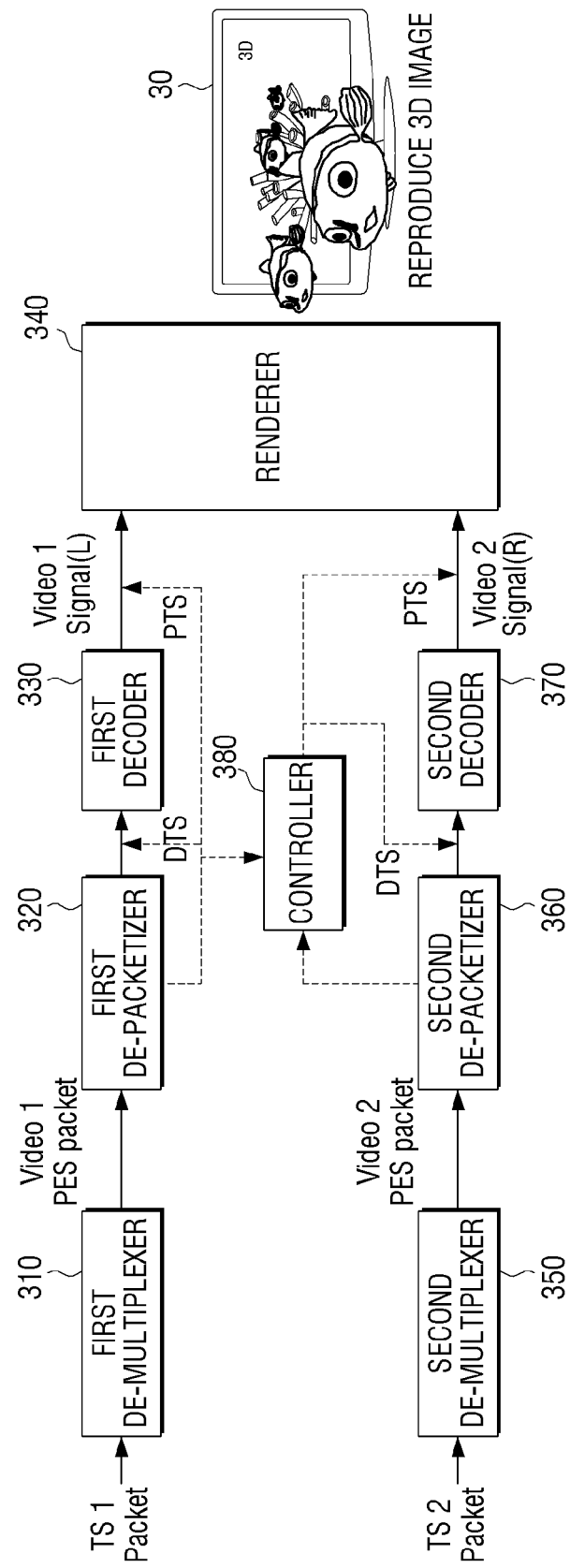

FIG. 20 is a block diagram illustrating a configuration of a receiving apparatus according to an exemplary embodiment in which a time code is used as sync information. The receiving apparatus of FIG. 20 includes a first de-multiplexer 310, a first de-packetizer 320, a first decoder 330, a renderer 340, a second de-multiplexer 350, a second de-packetizer 360, a second decoder 370, and a controller 380.

The first de-multiplexer 310 separates a video packet from a received first signal and provides the video packet to the first de-packetizer 320. The first de-packetizer 320 de-packetizes the video packet, detects a DTS and a PTS of the video packet received from the first signal, and provides time code information to the controller 380.

The second de-multiplexer 350 separates a video packet from a received second signal and provides the video packet to the second de-packetizer 360. The second de-packetizer 360 de-packetizes the video packet, detects a DTS and a PTS of the video packet received from the second signal, and provides time code information to the controller 380.

The first decoder 330 and the second decoder 370 decode the video data of the first and second signal, respectively.

The controller 380 calculates a time stamp difference between frames having the same time code with reference to the time code of each signal. The controller 390 corrects the time stamp of at least one of the first signal and the second signal, reflecting the calculated difference, and assigns the corrected time stamp information to the frame of each signal and provides the frames to the renderer 340. For example, if the time stamp of the left-eye image is later than the time stamp of the right-eye image, the time stamps may be set to be consistent with each other by adjusting the time stamp of the left-eye image or adjusting the time stamp of the right-eye image. The renderer 340 combines the left-eye image and the right-eye image according to the adjusted time stamp, thereby reproducing the 3D image.

Figure 21:
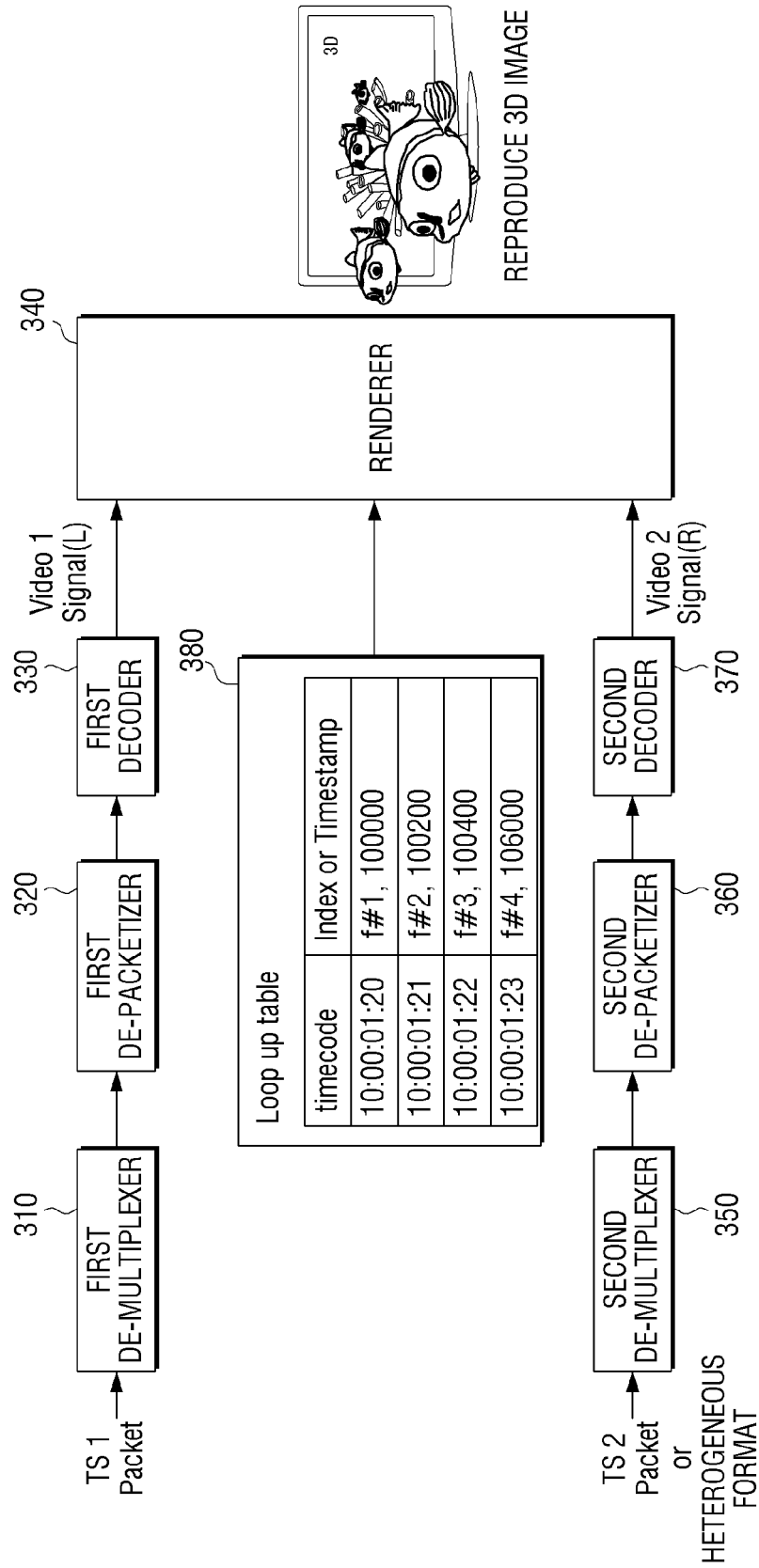

FIG. 21 is a block diagram illustrating a configuration of a receiving apparatus according to still another exemplary embodiment in which a time code is used as sync information. In the same way as in FIGS. 19 and 20, the receiving apparatus of FIG. 21 may include a first de-multiplexer 310, a first de-packetizer 320, a first decoder 330, a renderer 340, a second de-multiplexer 350, a second de-packetizer 360, a second decoder 370, and a controller 380.

The controller 380 may obtain a lookup table on which an index number matching a time code or a time code is recorded through a separate source or path and may store the lookup table. The controller 380 searches for a left-eye image and a right-eye image that should be reproduced at the same time with reference to the lookup table, and provides a result of the searching to the renderer 340. Accordingly, synchronization and reproduction are performed. Such a lookup table may be received along with one of the first signal and the second signal and may be provided through a different path.

That is, a content creator of the left-eye image and the right-eye image may generate a lookup table in advance and may distribute it to the receiving apparatus.

According to a situation, time codes may be discontinuously generated in a single program. In this case, if a channel is changed while a program is broadcast, it may be difficult to find another image to be synchronized with the left-eye image or right-eye image which is input on a real time basis, due to a random access time delay. Accordingly, if a lookup table regarding random access is generated in advance, the random access time delay may be minimized.

As described above, the receiving apparatus may be implemented in various forms.

Also, the time code may be provided to the receiving apparatus in various ways as described above.

FIG. 22 illustrates a stream structure when a time code is provided using a video stream. Referring to FIG. 22, the time code may be transmitted using supplemental enhancement information (SEI) which is defined by advanced video coding (AVC) ISO/IEC 14496-10. That is, as shown in FIG. 22, the time code may be transmitted using seconds_value, minutes_value, hours_value, and n_frames which are defined in the Picture timing SEI.

Figure 23:
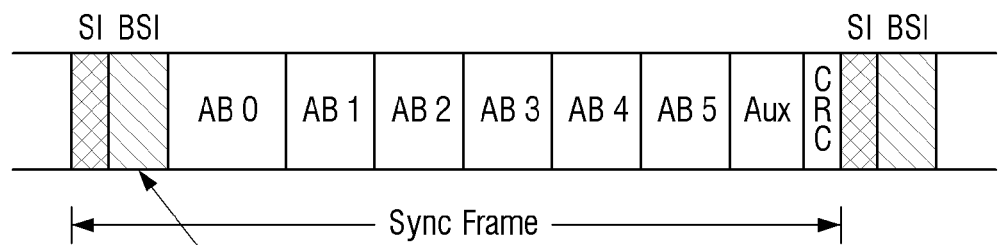
FIG. 23 is a view illustrating a structure of an audio ES including a time code.

FIG. 23 illustrates a stream structure when a time code is provided using an audio stream. As shown in FIG. 23, the audio stream has a structure in which sync frames are continuously arranged according to AC-3(ATSC A/52: 2010).

A bit stream information (BSI) area of a sync frame that provides information of the sync frame may provide information on a time code.

FIG. 24 illustrates a PMT syntax when a time code is provided through a PMT. Referring to FIG. 24, the time code may be provided through a reserved area or a descriptor of the PMT which is periodically transmitted. The PMT may be provided on a GoP basis or on a frame basis for assigning a synchronized time code. In FIG. 9, the PMT is provided after every two frames. However, the PMT including the time code may be provided after each frame.

As described above, a variety of information may be used as sync information and their locations may also be set variously.

Figure 25:
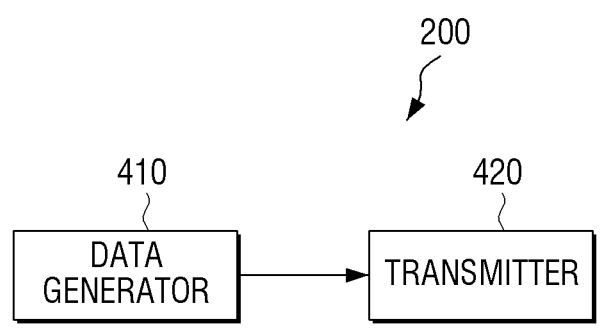
FIGS. 25 and 26 are block diagrams illustrating a configuration of a transmitting apparatus according to an exemplary embodiment.

FIG. 25 is a block diagram illustrating an example of a configuration of a transmitting apparatus which transmits a signal including such sync information. Referring to FIG. 25, a transmitting apparatus 200 includes a data generator 410 and a transmitter 420. The transmitting apparatus 200 of FIG. 25 may be one of the plurality of transmitting apparatuses 200-1 and 200-2 of the system of FIG. 1. Also, data provided by the transmitting apparatus 200 of FIG. 25 may be one of a plurality of data constituting a multimedia content. Accordingly, when the data is transmitted to a receiving apparatus along with another data transmitted from another transmitting apparatus, the receiving apparatus may reproduce the multimedia content using the data. For the convenience of explanation, the data provided by the transmitting apparatus of FIG. 25 is referred to as first data and the data provided by another transmitting apparatus is referred to as second data.

According to an exemplary embodiment, the first data may be one of a left-eye image and a right-eye image, and the second data may be the other one of the left-eye image and the right-eye image. Accordingly, the receiving apparatus configures a single 3D content by combining the first data and the second data. In this case, other data such as audio data or subtitle data may be provided to the receiving apparatus along with one of the first data and the second data or may be provided to the receiving apparatus through a separate path.

According to another exemplary embodiment, the first data includes at least one of video data, audio data, subtitle data, and additional data which constitute a multimedia content, and the second data includes the other data of the video data, the audio data, the subtitle data, and the additional data. Accordingly, even when the receiving apparatus reproduces 2D content rather than 3D content, the above-described exemplary embodiments can be applied as they are.

The data generator 410 generates transmission data including the first data and sync information. The sync information is information for synchronizing the first data and the second data.

As described above, the sync information may include at least one of content start information indicating a start point of a multimedia content, a time stamp difference value between the first data and the second data, a frame index, time code information, UTC information, and frame count information. The method for inserting such sync information has been described above and a redundant explanation is omitted.

The transmitter 420 transmits the stream generated by the data generator 410 to the receiving apparatus 100. A detailed configuration of the transmitter 420 may be implemented differently according to a type of the stream.

For example, if the transmitting apparatus of FIG. 25 is a broadcast transmitting apparatus, the transmitter 420 may include an RS encoder, an interleaver, a trellis encoder, and a modulator.

Also, if the transmitting apparatus of FIG. 25 is a web server which transmits a stream through a network such as the internet, the transmitter 420 may be implemented by using a network interface module which communicates with a receiving apparatus, that is, a web client, according to the HTTP protocol.

A detailed configuration of the data generator 410 may be implemented differently according to an exemplary embodiment.

Figure 26:
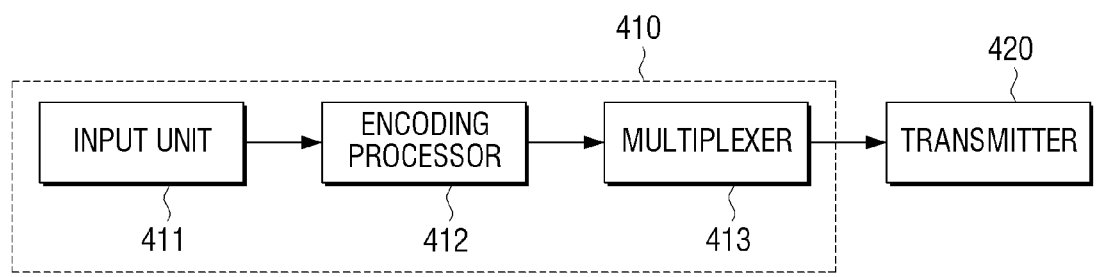

FIG. 26 is a block diagram illustrating an example of a detailed configuration of the transmitting apparatus.

Referring to FIG. 26, the data generator 410 includes an input unit 411, an encoding processor 412, and a multiplexer 413.

The input unit 411 receives first data and signaling information from a content creator. The signaling information is information that is used to generate sync information.

The encoding processor 412 encodes the first data, generates sync information using the signaling information, and adds the sync information to the encoded first data.

If the sync information is content start information, the encoding processor 412 generates a time stamp of a first frame based on a PCR and adds the time stamp as sync information.

Also, if a time stamp difference value is used as sync information, the signaling information may be implemented as information on a PCR of another transmitting apparatus that generates and transmits second data. The encoding processor 412 generates the time stamp difference value between the first and second data as sync information based on the signaling information, and may add the time stamp difference value to the encoded first data.

Also, if a time code is used as sync information, the first data and the sync information may be input to the input unit 411 without separate signaling information. The encoding processor 412 encodes the first data and the sync information as they are, and provides the encoded data to the multiplexer 413.

Besides these, a configuration to compress video data according to the MPEG standard may be added, but illustration and explanation thereof are omitted.

The multiplexer 413 generates transmission data by multiplexing additional data to the data generated by the encoding processor 412. The additional data may be program and system information protocol (PSIP) or electronic program guide (EPG) information.

The transmitter 420 converts the transport stream provided by the multiplexer 412 into a transmission signal by performing processing such as channel encoding and modulation with respect to the transport stream, and transmits the transmission signal through a channel. For the modulation, an 8 VSB method which is used in a terrestrial broadcast method or a 16 VSB method which is a high speed data rate method for a cable TV may be used.

In order for a receiving apparatus to receive different data through different paths, a plurality of transmitting apparatus should transmit data or one transmitting apparatus should transmit data using different transmitting units. When the plurality of transmitting apparatuses transmit data, the plurality of transmitting apparatuses should share a schedule of a program to generate and add sync information.

Figure 27:
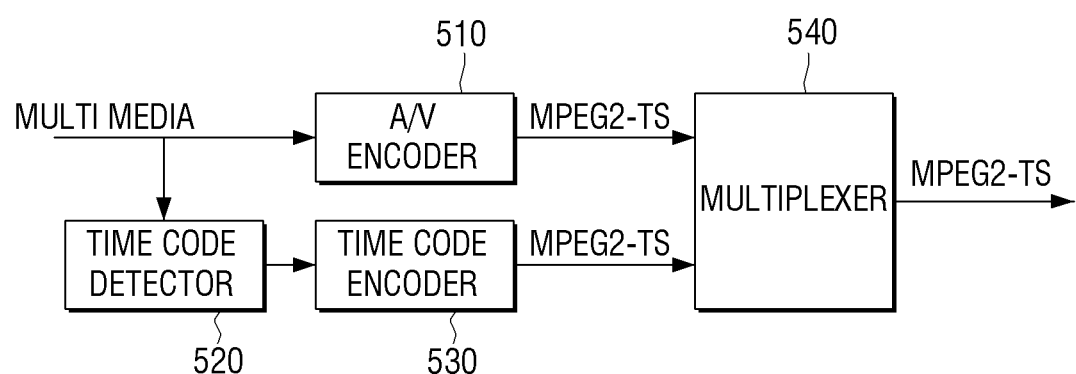
FIG. 27 is a block diagram illustrating an example of a configuration of a transmitting apparatus which transmits a time code using a private stream.

FIG. 27 illustrates a configuration of a transmitting apparatus according to an exemplary embodiment. The transmitting apparatus of FIG. 27 processes a time code as a separate private stream and transmits the time code. Referring to FIG. 27, the transmitting apparatus includes an A/V encoder 510, a time code detector 520, a time code encoder 530, and a multiplexer 540.

The A/V encoder 510 encodes A/V data which is included in input multimedia data. The A/V data may be encoded in a different way according to a standard that is applied to the transmitting apparatus.

The time code detector 520 detects a time code of an image from the input multimedia data and provides the time code to the time code encoder 530. The detected time code may be stored as a time line data file. The time code encoder 530 encapsulates the detected time code in an appropriate transmission format, combines the time code and a presentation time stamp which is calculated using the same program system clock as that of the A/V encoder 510, and synchronizes the time code with the A/V data which is processed by the A/V encoder 510.

The time code information processed by the time code encoder 530 is provided to the multiplexer 540 along with the A/V data processed by the A/V encoder 510. The multiplexer 540 multiplexes these data and outputs an MPEG2-TS.

Although not shown in FIG. 27, various configurations such as a pilot inserter, a modulator, an interleaver, a randomizer, and an RF up-converter may be added. Since these configurations are general configuration of the transmitting apparatus, detailed illustration and explanation thereof are omitted.

Figure 28:
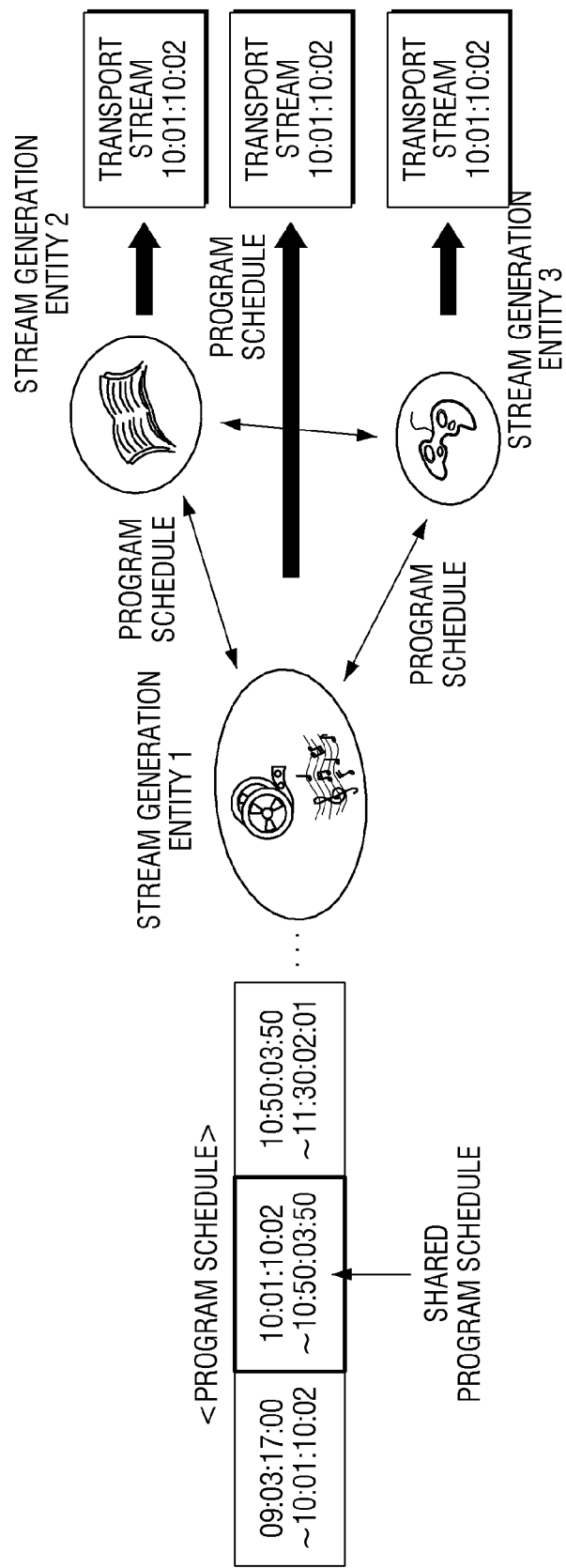
FIGS. 28 and 29 are views to explain various methods for sharing sync information at a plurality of transmitting apparatuses.

FIG. 28 illustrates a plurality of stream generation entities which share a time schedule of a program with one another.

For example, the stream generation entities may be a broadcasting station which transmits video and audio data, a third party which transmits additional data such as subtitles, and a third party which provides a relevant game. Referring to FIG. 20, in order to create a transport stream constituting a single program, one of the stream generation entities 1, 2, and 3 transmits a time schedule to the other stream generation entities based on a time code. Each of the stream generation entities may generate sync information using the time schedule, and generate and transmit transport streams. The time schedule or sync information is frame-based information having accuracy to synchronize a stream generation end unlike a time schedule provided by an existing EPG.

Figure 29:
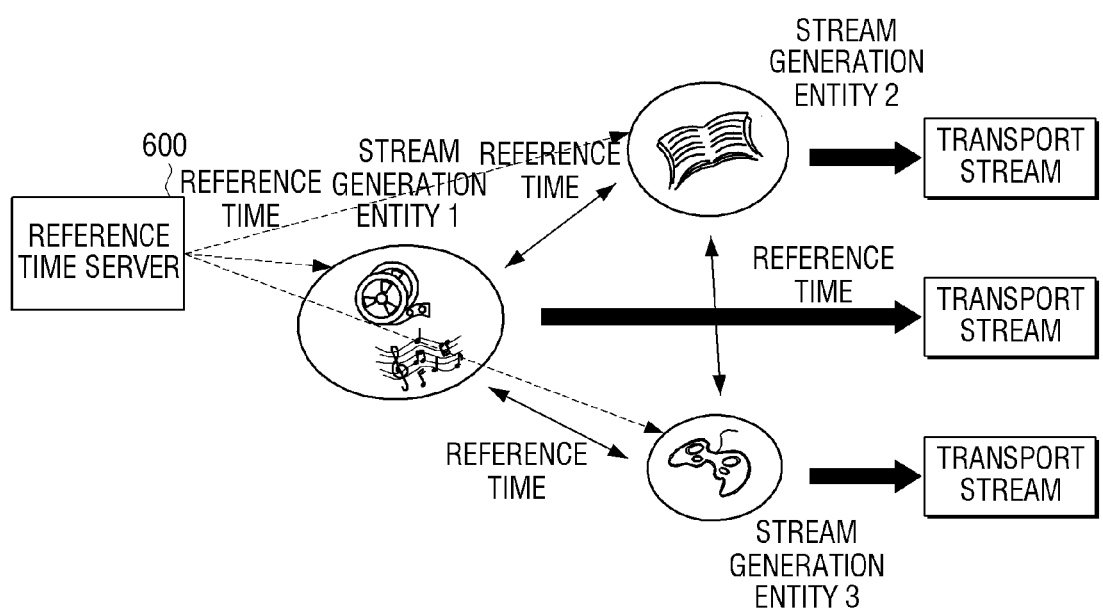

FIG. 29 is a view to explain another method for sharing information to generate sync information. Referring to FIG. 29, a reference time server 600 provides a reference time to each stream generation entity 1, 2, and 3. When the stream generation entities receive and share the reference time, that is, a PCR, through the same reference time server 600, the stream generation entities may generate the same DTS and PTS for the same content frame and may add the DTS and PTS.

Figure 30:
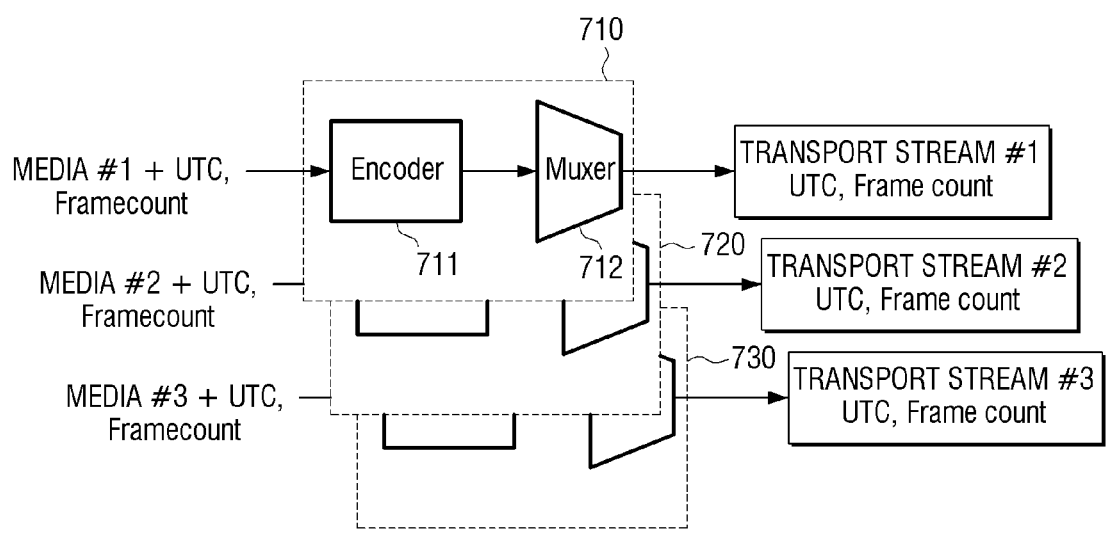
FIG. 30 is a view to explain a method for synchronizing a plurality of data using a coordinates universal time (UTC) or a frame count value.

FIG. 30 is a view illustrating an example of a configuration of a transmitting apparatus which uses a UTC or a frame count value as sync information.

Referring to FIG. 30, different media #1, #2, and #3 are provided to different stream generators 710, 720, and 730. In this case, a UTC or a frame count value may be provided along with each medium #1, #2, and #3. Each stream generator 710, 720, and 730 adds the UTC or the frame count value as sync information, generates a transport stream #1, #2, and #3, and transmits it.

As described above, since a variety of sync information is transmitted to the receiving apparatus along with each data, the receiving apparatus may exactly synchronize the data based on the sync information and may reproduce content.

Figure 31:
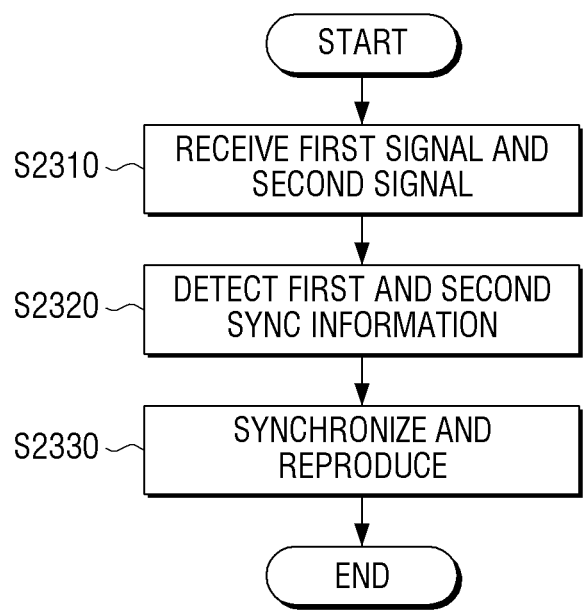
FIGS. 31 and 32 are flowcharts to explain a method for reproducing a multimedia content according to various exemplary embodiments.

FIG. 31 is a flowchart to explain a method for reproducing content according to an exemplary embodiment.

Referring to FIG. 31, a receiving apparatus receives a first signal and a second signal though different paths (Operation S2310). The first signal includes first sync information along with first data, and the second signal includes second sync information along with second data.

The receiving apparatus detects the first and second sync information (Operation S2320), and identifies matching frames based on the sync information, and synchronizes and reproduces the frames (Operation S2330). Specifically, the receiving apparatus may directly correct time stamps of the matching frames, or may directly compare the sync information and may synchronize and reproduce matching frames.

Figure 32:
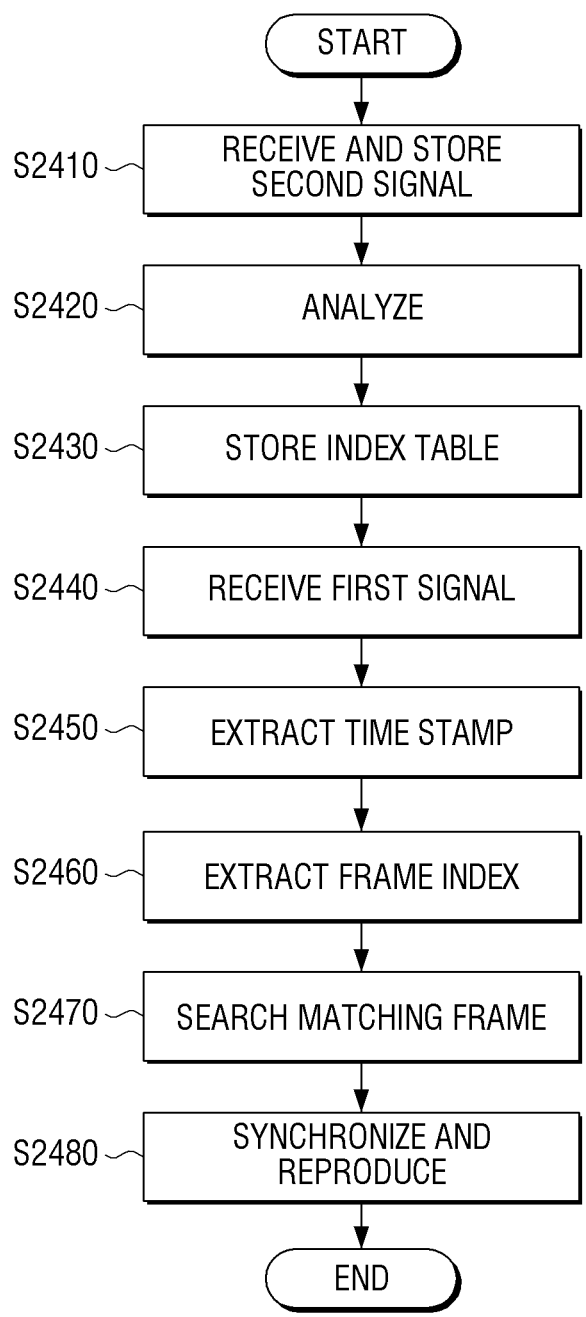

FIG. 32 is a flowchart to explain a reproduction method of a receiving apparatus according to another exemplary embodiment. Referring to FIG. 32, the receiving apparatus receives a second signal of two signals and stores the second signal (Operation S2410). The receiving apparatus analyzes the second signal (Operation S2420), and detects a frame index of data included in the second signal and stores the frame index in an index table (Operation S2430).

When a first signal is received separately from the second signal (Operation S2440), the receiving apparatus extracts a time stamp of a frame of the first signal (Operation S2450). Then, the receiving apparatus extracts a frame index of the corresponding frame (Operation S2460), and searches for a matching frame by comparing the frame index and the index table (Operation S2470).

Then, the receiving apparatus synchronizes and reproduces the matching frames (Operation S2480).

Examples of the sync information and a method for synchronizing using the same have been described in the above-described exemplary embodiments, and thus a redundant explanation is omitted.

Besides synchronization between the left-eye image and the right-eye image described above, synchronization between heterogeneous data such as an image and a text or an image and a sound may be performed. For example, when an ultra high definition (UHD) image is transmitted, UHD additional images may be transmitted on a non-real time basis in order to guarantee compatibility with an apparatus that uses an existing HD channel. In this case, inter-image synchronization is essential to restore a single original image. Accordingly, the synchronization technology according to the above-described exemplary embodiments may be used for the UHD transmission.

A program to perform the methods according to the above-described exemplary embodiments may be stored in various kinds of recording media and executed by a processor.

Specifically, a code to perform the above-described methods may be stored in various kinds of recording media readable by a terminal, such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, and a CD-ROM.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A receiving apparatus comprising:
   a receiver which receives, through different paths, a first signal comprising a left-eye image and first sync information and a second signal comprising a right-eye image and second sync information; and
   a signal processor which synchronizes and reproduces the left-eye image and the right-eye image using the first sync information and the second sync information,
   wherein the first sync information and the second sync information comprise coordinated universal time (UTC) information,
   wherein the signal processor compares the UTC information and process the left-eye image and the right-eye image having the same UTC to be synchronized with each other.

* * * * *